United States Patent
Sinnreich et al.

(10) Patent No.: US 7,602,748 B2
(45) Date of Patent: Oct. 13, 2009

(54) FIXED-MOBILE COMMUNICATIONS WITH MID-SESSION MODE SWITCHING

(75) Inventors: Heinrich Sinnreich, Richardson, TX (US); Alan B. Johnston, St. Louis, MO (US)

(73) Assignee: Verizon Business Global LLC, Ashburn, VA (US)

( * ) Notice: Subject to any disclaimer, the term of this patent is extended or adjusted under 35 U.S.C. 154(b) by 642 days.

(21) Appl. No.: 11/202,589

(22) Filed: Aug. 12, 2005
(Under 37 CFR 1.47)

(65) Prior Publication Data
US 2006/0072542 A1 Apr. 6, 2006

Related U.S. Application Data

(60) Provisional application No. 60/601,256, filed on Aug. 13, 2004.

(51) Int. Cl.
*H04L 12/28* (2006.01)
(52) U.S. Cl. .................................. 370/331; 455/437
(58) Field of Classification Search ................ 370/465, 370/466, 467, 331, 351; 455/418, 426.1, 455/437
See application file for complete search history.

(56) References Cited

U.S. PATENT DOCUMENTS

| | | | | |
|---|---|---|---|---|
| 5,655,003 A | * | 8/1997 | Erving et al. | 379/418 |
| 5,734,980 A | * | 3/1998 | Hooper et al. | 455/434 |
| 5,878,087 A | * | 3/1999 | Ichihara | 375/316 |
| 5,950,130 A | * | 9/1999 | Coursey | 455/432.1 |
| 6,088,348 A | * | 7/2000 | Bell et al. | 370/343 |
| 6,477,156 B1 | * | 11/2002 | Ala-Laurila et al. | 370/331 |
| 6,647,001 B1 | * | 11/2003 | Bhagavath et al. | 370/331 |
| 6,690,929 B1 | * | 2/2004 | Yeh | 455/406 |
| 6,834,045 B1 | * | 12/2004 | Lappetelainen et al. | 370/329 |
| 7,149,524 B2 | * | 12/2006 | Reynolds | 455/437 |
| 2002/0147008 A1 | * | 10/2002 | Kallio | 455/426 |
| 2004/0022216 A1 | * | 2/2004 | Shi | 370/335 |
| 2004/0087307 A1 | * | 5/2004 | Ibe et al. | 455/436 |
| 2004/0192375 A1 | * | 9/2004 | Cho et al. | 455/550.1 |
| 2004/0219948 A1 | * | 11/2004 | Jones et al. | 455/552.1 |
| 2004/0266426 A1 | | 12/2004 | Marsh et al. | |

(Continued)

FOREIGN PATENT DOCUMENTS

GB 2364620 1/2002

(Continued)

OTHER PUBLICATIONS

Banerjee et al., "Analysis of SIP-based Mobility Management in 4G Wireless Networks" Computer Communications, Elsevier Science Publishers BV, Amsterdam, NL, vol. 27, No. 8, May 1, 2004.

(Continued)

*Primary Examiner*—Dang T Ton
*Assistant Examiner*—Mandish Randhawa

(57) ABSTRACT

A method for performing mode-agile communications during a communications session is disclosed. A communications terminal device supporting multiple modes of access is configured to determine when, during a session involving a first mode of access communications, a second mode of access is available and is to be used for subsequent communications for the session. The communications terminal device initiates or controls switchover from one mode of access to another.

23 Claims, 13 Drawing Sheets

U.S. PATENT DOCUMENTS

| | | | |
|---|---|---|---|
| 2006/0075467 A1* | 4/2006 | Sanda et al. | 726/1 |
| 2006/0084417 A1* | 4/2006 | Melpignano et al. | 455/418 |
| 2006/0135152 A1* | 6/2006 | Kirkpatrick | 455/426.1 |
| 2006/0229071 A1* | 10/2006 | Haverinen et al. | 455/432.1 |
| 2007/0047504 A1* | 3/2007 | Akram et al. | 370/338 |
| 2008/0132228 A1* | 6/2008 | Mousseau et al. | 455/426.1 |

FOREIGN PATENT DOCUMENTS

| | | |
|---|---|---|
| WO | WO 2004/114707 | 12/2004 |

OTHER PUBLICATIONS

Sattari et al., "Seamless Handover Between WLAN and UMTS", Vehicular Technology Conference, 2004, VTC 2004-Spring, 2004 IEEE 59th Milan, Italy, May 17-19, 2004, Piscataway NJ, US, IEEE, US vol. 5, May 17, 2004, pp. 3035-3038.

"IEEE Std 802.11b-1999: Higher-Speed Physical Layer Extension in the 2.4 GHz Band", Institute of Electrical and Electronics Engineers, Inc., copyright 2000.

"IEEE Std 802.11b-1999: Amendment 2: Higher-Speed Physical Layer (PHY) Extension in the 2.4 GHz Band—Corrigendum 1", Institute of Electrical and Electronics Engineers, Inc., copyright 2001.

"IEEE 802.1X: Port-Based Network Access Control", IEEE Computer Society, Dec. 13, 2004.

Wedlund et al., "*Mobility Support Using SIP*", ACM/IEEE International Conference on Wireless and Multimedia, WOWMOM, Aug. 1999, http://www.cs.columbia.edu/~hgs/papers/Wed19908_Mobility. pdf#search='wedlund%20mobility%20support'.

Schulzrinne et al., "*Application-Layer Mobility Using SIP*", Mobile Computing and Communications Review, vol. 1, No. 2, http://www.cs.columbia.edu/~hgs/papers/Schu0007_Application.pdf.

Dutta et al., "*Application Layer Mobility Management Scheme for Wireless Internet*", 3G Wireless 2001, http://www.argreenhouse.com/SIP-mobile/sip-3g-submit.pdf.

Dutta et al., "*Supporting Mobile Wireless Internet Roaming Users in a SIP Environment*", In Proc. of SIP 2000 Conference, (Paris, France), May 2000, http://www.argreenhouse.com/SIP-mobile/sip2000-cdrom.ppt.

Schulzrinne, H., "*SIP for Mobility presentation, SIP 2001*", Conference International SIP—Paris, France, Feb. 21, 2001, http://www.argreenhouse.com/SIP-mobile/sip2001-hgs-mm.pdf.

Dutta, A., "*SIP Mobility and 3G Wireless presentation, SIP Summit, Pulver.com*", SIP Conf 2001, http://www.argreenhouse.com/SIP-mobile/sip-2001-pulver.ppt.

Dutta et al., "Implementing a Testbed for Mobile Multimedia,", *IEEE Conference on Global Communications (GLOBECOM)*, San Antonio, Texas, Nov. 2001, http://www.argreenhouse.com/SIP-mobile/testbed.pdf.

Dutta et al., "Multilayered Mobility Management for Survivable Network", *Milcom*, Vienna, Virginia, Nov. 2001, http://www.argreenhouse.com/SIP-mobile/milcom_imm.pdf.

Vakil et al., "*Virtual Soft Hand-off in IP-Centric Wireless CDMA Networks*", Proceedings of International Conference on 3G Wireless and Beyond, May 29-Jun. 2, 2001, http://www.argreenhouse.com/SIP-mobile/sip-virtual. pdf#search='vakil%20virtual%20soft%20handoff'.

Zhang et al., "*Distributed Soft Handoff in All-1P Wireless Networks*", In Proc. of IEEE International Conference on Third Generation Wireless and Beyond (3Gwireless'01), (San Francisco, CA), pp. 460-465, May 2001, http://www.argreenhouse.com/SIP-mobile/13_handoff. pdf#search='Zhang%20distributed%20soft%20handoff'.

Dutta et al., "*Optimized Handoff Scheme for Application Layer Mobility Management*", Mobile Computing and Communications Review, Nov. 2002, http://www.argreenhouse.com/SIP-mobel/dutta-mc2r.pdf#search='Dutta%20optimized%20fasthandoff'.

Dutta et al., "*Multimedia SIP sessions in a Mobile Heterogeneous Access Environment*", World Wireless Congress, May 28-31, 2002, http://www.argreenhouse.com/SIP-mobile/sip-hetero-3g. pdf#search='dutta%20multimedia%20sip%20sessions'.

Nakajima et al., "*Handoff Delay Analysis for SIP Mobility in IPv6 Testbed*", ICC 2003—Personal Communication Systems and Wireless LANs, May 2003, http://www.argreenhouse.com/SIP-mobile/sip-ipv6. pdf#search='nakajima%20handoff%20delay%20analysis'.

* cited by examiner

FIXED-MOBILE COMMUNICATIONS WITH MID-SESSION MODE SWITCHING

RELATED APPLICATIONS

This application claims priority under 35 U.S.C. § 119 based on U.S. Provisional Application Ser. No. 60/601,256, filed Aug. 13, 2004, the disclosure of which is hereby incorporated by reference in its entirety.

FIELD OF THE INVENTION

Implementations consistent with the invention relate generally to providing multimode communication and more particularly to providing session initiation protocol (SIP)-based fixed-mobile converged communication services.

BACKGROUND OF THE INVENTION

Contemporary communication systems may employ wireless and/or wireline transmission technologies for conveying data from a source to a destination. Users typically employ different specialized devices for accessing particular types of communication services, such as voice, data, and/or messaging services. For example, a cellular telephone may be used to make a wireless voice call, a wireless personal digital assistant (PDA) may be used to send and receive e-mail messages, a facsimile machine may be used for facsimile transmissions using a plain old telephone system (POTS) landline, and/or a desktop computer may access multimedia applications using digital subscriber line (DSL) over shielded twisted pair. As a result, these transmission-specific or network-specific devices may dictate that users be required to have numerous devices to perform a range of desired communication functions. The need for multiple devices may add complexity to the provisioning of robust communication solutions.

Further complicating communication solutions is the fact that each device may require a unique service agreement, or subscription, with a service provider. For example, a user may have a service contract with a wireless carrier for cellular phone service, a service agreement with a separate provider for DSL service and still another service agreement for conventional landline telephone service. The need to have a unique identifier for each device used by a user may add further complexity to contemporary communication solutions. Each service provider may require that a user have a unique identifier associated with its network. For example, a user may have one number assigned to them for a cellular phone account, a separate number assigned for a landline account, and an e-mail address, or Ethernet address, assigned for a DSL account. As a result, the user needs to keep track of these identifiers and may have to ensure that other parties have these identifiers in order to communicate with the user.

It is generally desirable to enable communications among parties via whatever means or modes of communication are available to them. For example, a cellular or wireless user can readily exchange phone calls with PSTN users. However, technologies have yet to be ubiquitously deployed wherein a telephone caller may readily communicate with an instant messaging client on a personal computer for example. Aside from a desire to support cross-communications of this type, it is desirable for a user to freely employ any mode of communication available, even using diverse modes of communication from the same device. Accordingly, some devices recently developed may support multiple modes of communication. For example, an otherwise conventional mobile telephone device communicating via 2G or 3G may also be equipped to recognize a nearby WiFi 'hot spot' and establish communications through the later.

In the context of multimodal communications devices, such as wireless communication devices that can support more than one wireless protocol or carrier frequency band, several modes of communication may sometimes be available. At any given time and place one type of communication may be preferred over others due to proximity, low cost, better quality or higher reliability. However, the choice of a mode of communication is controlled by a network, and may occur at any time either upon initiation of a session or during a session. A so-called 'mid-call hand-off', wherein the mode of access changes while a session is maintained, may take place without warning and may cause a brief interruption in the communications between parties.

Furthermore, the change from one mode to another, initiated by a network-resident entity, may result in a suddenly changing the connection to one that is less desirable to the user. For example, a connection with a superior signal strength may exhibit lower bandwidth, lesser security or greater cost. The mid-session switching of access modes may occur without regard to the user's desires or preferences, resulting in undesirable operation.

SUMMARY OF THE INVENTION

Various implementations in accordance with the present teachings provide for mid-session changes in access modes to be initiated or moderated by a mobile communications device, in contrast to network-controlled approaches. Furthermore, various implementations provide for the device to carry out such mode switching with due regard for the selection or preferences of the user of the device.

In accordance with one implementation, a method for conducting a communications session involving a communication terminal device accessing a network is provided. An exemplary method involves, at the communication terminal device, conducting communications corresponding to the session via a first mode of access; determining, at the communication terminal device, that a second mode of access is available to be used for the communications corresponding to the session; from the communication terminal device, sending indication to the network that the second mode of access is to be used; and, at the communication terminal device, conducting subsequent communications corresponding to the session using the second mode of access.

According to another aspect of the present teachings, a communication device is provided which engages in a communications session and conducts communications corresponding to the session via a first mode of access, determines that a second mode of access is available, sends indication to a network that the second mode of access is to be used for communications of the session and conducts subsequent communications corresponding to the session using the second mode of access. In some implementations, the device may send a SIP INVITE message to the network during the session to indicate that access mode switchover is to occur.

In accordance with another aspect of the present teachings, a method is carried out in a communication network for conducting a communications session involving a communications terminal device. The method comprises conducting communications corresponding to the session via a first mode of access between the network and the device; receiving indication from the device that a second mode of access between the network and the device is to be used for subsequent communications corresponding to the session; and conducting subsequent communications corresponding to the session using the second mode of access between the network and the device. The degree of mobility of the device enabled by the first mode of access may be substantially different than the mobility enabled by the second mode of access.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

As used herein, the term 'access' generally refers to how a subscriber or user of the communication network is communicably coupled to the network through some form of transmission link. Examples of different modes of access are CDPD, 3G, WiMax, WiFi, Ethernet-based LAN/WAN and a conventional telephone subscriber loop. Modes of access may differ in terms of, for example, radio frequency band occupied, transmission coding and multiplexing schemes, transmission protocols, or propagation medium used (wireless, wireline, optical, etc.).

The notion of "fixed-mobile convergence" arises in considering how a mode-agile device and communication system can carry on a sessions that use both high-mobility 2G communications, for example, and low-mobility WiFi links. Using 2G wireless enables free mobility over a broad area whereas a given WiFi link is highly localized by comparison and is therefore relatively fixed. Electrical couplings are usually even more localized.

The systems and methods may further permit substantially any type of fixed and/or mobile communication, such as multimedia, voice, data, messaging, and/or video, to be seamlessly performed, even simultaneously in some cases, using a single multimode communication device. For example, a single wireless device may be used to place a call via substantially any type of network including, but not limited to, an internet network, 2G/3G mobile networks, time division multiplexed (TDM) networks, wireless networks, such as wireless fidelity (Wi-Fi), and Internet protocol (IP)-based private branch exchange (PBX) system networks. Furthermore, implementations may facilitate switching from one mode of communication to another mode of communication via a request from a subscriber device. The subscriber device may be configured to initiate mode switching automatically, semi-automatically or manually via user inputs. In some implementations, the user may specify, before and outside the context of any particular sessions, when or under what circumstances mode switchover is permissible. Various techniques by which user preferences may be expressed to, and acted upon by, a communication device are further described below.

Exemplary Network

Figure 1:
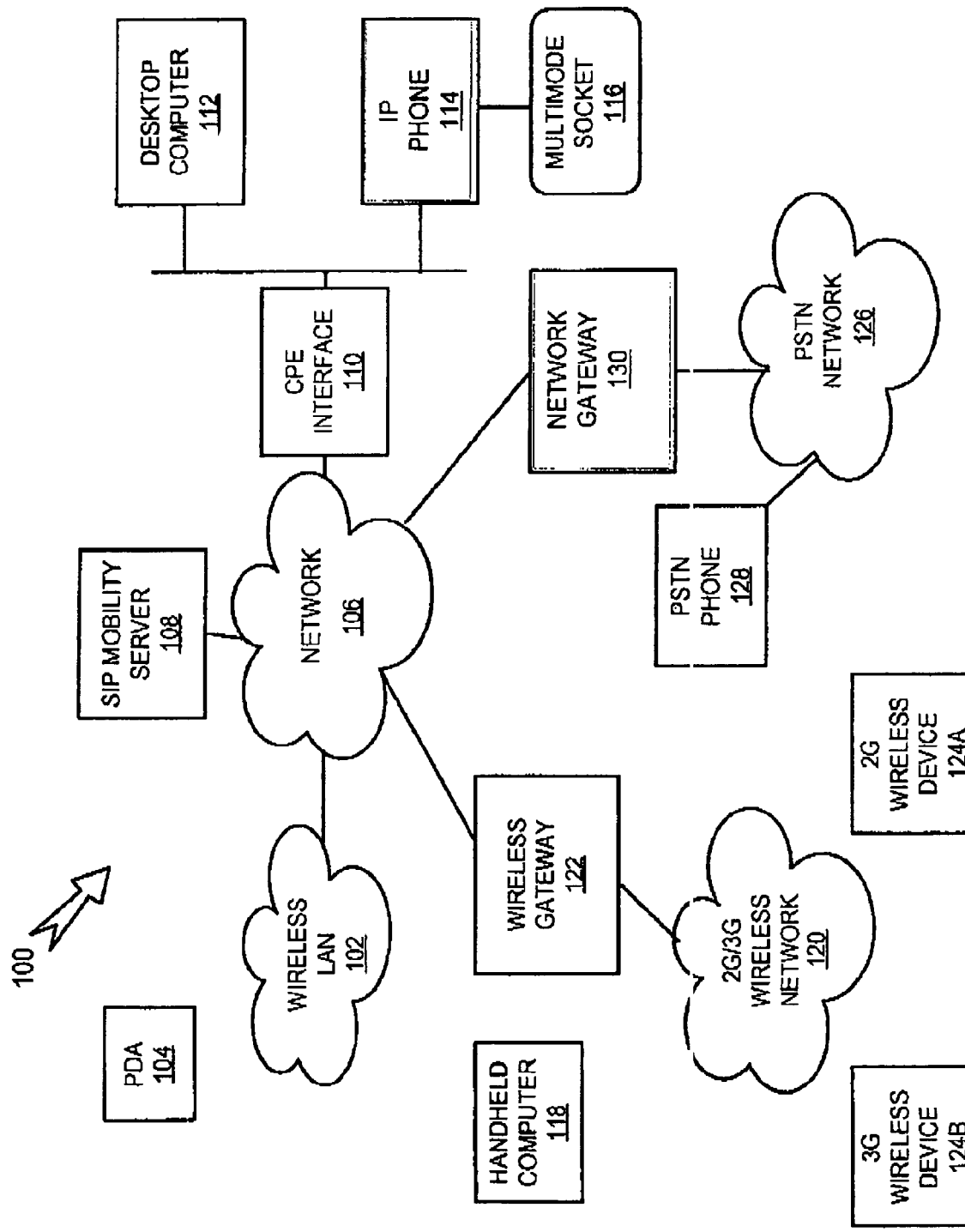
FIG. 1 is a block diagram of an exemplary network in which systems and methods for providing mode-agile communication sessions may be implemented consistent with the principles of the invention.

FIG. 1 is a block diagram of an exemplary network in which systems and methods for providing multi-agile communication sessions may be implemented consistent with the principles of the invention. Network 100 may be employed to facilitate communication between wireless and/or wireline devices and may include a wireless local area network (LAN) 102, a personal digital assistant (PDA) 104, a network 106, a SIP mobility server 108, a customer premise equipment (CPE) interface 110, a desktop computer 112, a IP telephone 114, a multimode socket 116, a handheld computer 118, a 2G/3G wireless network 120, a wireless gateway 122, a 2G wireless device 124A, a 3G wireless device 124B, a public switched telephone network (PSTN) 126, a PSTN telephone 128, and a network gateway 130.

Wireless LAN 102 may include any device and/or network capable of providing local area connectivity to wireless communication devices, such as PDA 104. Wireless LAN 102 may include network hardware such as wireless routers or access points, switches, network address translators (NATs), etc. Wireless LAN 102 may interface with network 106 via a wired and/or wireless link. For example, wireless LAN 102 may run a wireless fidelity (Wi-Fi) protocol such as an IEEE 802.11b protocol. Wireless LAN 102 may connect user devices, such as PDA 104, with user devices operating on other networks, such as handheld computer 118, 2G wireless device 124A and/or PSTN phone 128.

PDA 104 may include any wireless device capable of processing machine-readable instructions to perform an operation. For example, PDA 104 may include a handheld device having a wireless transceiver for sending and receiving data over a wireless link. PDA 104 may also include a microprocessor for executing software applications, memory, a user display device, and/or a user input device, such as a touch sensitive display, a keypad, and/or a microphone. PDA 104 may be implemented as a standalone device or may incorporate functionality associated with other devices, such as a wireless phone. PDA 104 may be used to send and receive data to/from one or more wireless networks, such as wireless LAN 102.

Network 106 may include any type of network or even a combination of networks, such as a Wide Area Network (WAN) like the World Wide Web. Network 106 may further include transport and/or network devices such as routers, switches, and/or firewalls. Network 106 may operate as the primary transport infrastructure for data sent to, and/or received from, wireless LAN 102, CPE interface 110, wireless gateway 122, and/or network gateway 130. An implementation of network 106 may operate as an Internet protocol (IP) network. Network 106 may cooperatively operate with other networks running substantially any data networking or communications protocols, such as asynchronous transfer mode (ATM), frame relay, synchronous optical network (SONET) or integrated services digital network (ISDN).

Network 106 may support one or more network protocols that can be used to enhance seamless communication using wireless devices. For example, for session initiation or call set-up, network 106 may support SIP, SIP for instant messaging and presence leveraging extensions (SIMPLE), single number IP communication protocols such as ENUM, as well as other protocols suitable for facilitating multimedia converged services. Network 106 may include a SIP home registrar operating alone, or in conjunction with SIP mobility server 108, for maintaining a database of network identities associated with fixed and/or mobile devices operating in network 106.

Network 106 may operate in conjunction with one or more gateways, such as wireless gateway 122, to determine and/or detect the availability of wireless devices that are within a signaling range of one or more networks associated with network 106. A wireless device that has been detected by a network and/or gateway may correspond to presence information, implying or indicating availability of an associated end user to receive communications. Determining presence may include detecting a wireless device, identifying a wireless device and/or determining one or more network protocols that the wireless device is capable of receiving and/or transmitting. In a similar way, capabilities of the device, such as display size, codec schemes or media types supported, may also be sensed. Network 106 may be configured to automatically detect and/or communicate with wireless devices based on dynamic registration of the wireless device. This eliminates the need for manual, explicit registration actions by the user.

SIP mobility server 108 (hereinafter SIP server 108) may include any device capable of employing a SIP signaling protocol for creating, modifying and/or terminating sessions, such as IP voice calls and/or multimedia conference calls. SIP server 108 may be augmented with private extensions for allowing other SIP servers to assert the identities of end users and/or end systems when operating in a trusted domain. For example, SIP server 108 may operate as a SIP registrar for maintaining a database of user and/or network identifiers, such as URI's. Network identifiers may be used to locate a called party's device. For example, assume that a user may have a unique network identifier associated with a wireless SIP phone. Since a mobile device may move throughout a network and/or across networks, a SIP registrar may maintain information associating the network identifier with particular portions of the network where the wireless SIP phone can be reached at a particular point in time. As the wireless SIP phone moves from one location to another, the SIP registrar database may be updated to reflect a current location of the device. The SIP registrar may maintain network identifiers for both source devices and destination devices to facilitate SIP-based multimode communication sessions.

The use of one or more SIP servers within network 100 may facilitate seamless mode-agile communications. When more than one SIP server is operating in network 100, one SIP server may operate as a home registrar and other SIP servers may operate as visiting SIP servers. Implementations of the invention may use a single home SIP server operating as a home registrar for facilitating mode-agile communications without the need for visiting SIP registrars and/or SIP servers. SIP server 108 may include additional functionality when acting as the home registrar, such as SIP proxy server functionality to facilitate the forwarding of SIP messages across network 100 on behalf of SIP devices operating in conjunction with network 100.

CPE interface 110 may include any device capable of communicatively coupling one or more pieces of customer premise equipment to network 106. CPE interface 110 may be associated with one or more customer locations, such as an office building, university campus, government facility, and/or hospital. CPE interface 110 may include hardware and/or software for coupling customer-owned communication devices to network 106. In addition, CPE interface 110 may include security devices such as firewalls and/or network address translators (NATs). In one implementation, CPE interface 110 may further include a customer LAN connecting desktop computer 112 and IP telephone 114 operating in conjunction with multimode socket 116 (hereinafter socket 116), to network 106. CPE interface 110 may aggregate communication data from desktop computer 112, IP telephone 114, and/or socket 116 before making the data available to network 106.

Desktop computer 112 may include any device capable of processing machine-readable instructions for performing an operation. Desktop computer 112 may include conventional computers, such as personal computers, laptops, servers, and/or workstations.

IP telephone 114 may include any telephony device capable of sending and receiving a telephony voice data stream over a packet network. Examples are SIP-based IP phones which may be directly coupled to an Ethernet LAN. As shown by multimode socket 116, an IP phone appliance may also serve as an access point for a multimode communication device. Multimode socket 116 provides a convenient access point for multimodal devices, with the IP phone acting as a passthrough of sorts. For example, the multimode device may 'dock' into the socket to receive network connectivity as well as battery recharging, speakerphone or enhanced display capabilities. The multimode device achieves connection through the LAN connection of IP phone 114. This arrangement conserves LAN jacks and provides user convenience. If properly equipped, a multimode communication device may also establish a Bluetooth wireless connection with the IP phone so that no physical or electrical contact needs to be established between the devices. The multimode communication device may sense the availability of the Bluetooth link and perform access mode switching if the user desires. It is contemplated that the multimode device may sense the identity of the IP phone and selectively enable the Bluetooth access link according to the identity of the IP phone.

IP phone may be part of an 'IP PBX' system causing a group of such phones, such as in a business enterprise, to function as a private branch exchange (PBX). A PBX phone may implement a company-internal dial plan and provide for enhanced calling features such as call transfers, call forwarding, conferencing, call pickup and/or support of hunt groups.

Handheld computer 118 may include any device capable of processing machine-readable instructions to perform an operation. For example, handheld computer 118 may include a palmtop computer having a wireless communication interface for sending and receiving data. Implementations of handheld computer 118 may operate with wireless LAN 102, 2G/3G wireless network 120 and/or network 106.

2G/3G wireless network 120 may include any network capable of transmitting and/or receiving 2G and/or 3G compatible wireless signals. For example, 2G/3G wireless network 120 may be implemented as a cellular network having one or more base stations for transmitting and receiving wireless signals. The base stations may send data to 2G wireless device 124A and/or 3G wireless device 124B when a calling party is attempting to reach a called party associated with one, and/or both, wireless devices 124A and 124B.

2G/3G wireless network 120 may include a home location register (HLR) for implementing a database containing subscriber information associated with the mobile network. Information contained in an HLR may include subscriber names, billing information, account status, and/or subscriber device information. An HLR may interact with other devices, such as a payment server for performing operational functions, such as billing subscribers for usage of the wireless network. 2G/3G wireless network 120 may include a mobile application part (MAP) proxy to provide mobility procedures to SS7 applications. The MAP layer of SS7 may include protocol details that support mobility functions such as registration, authentication, and/or call completion while providing service transparency to roaming subscribers. An HLR and/or MAP proxy may operate with 2G/3G wireless network 120 to provide 2G services to 2G wireless device 124A and/or to provide 3G services to 3G wireless device 124B.

Wireless gateway 122 may include any device capable of interfacing 2G/3G wireless network 120 with another network such as wireless LAN 102, network 106, and/or PSTN 126. Wireless gateway 122 may convert 2G/3G compatible protocols into IP compatible protocols. Wireless gateway 122 may further implement protocols such as SIP when making data available to network 106. Wireless gateway 122 may receive communication data, process communication data, handoff communication data, and/or perform other functions such as error reporting and/or correction.

2G wireless device 124A may include any device capable of sending and/or receiving 2G compatible data. For example, 2G wireless device 124A may include a 2G compatible cellular telephone, a 2G compatible PDA, and/or a 2G compatible handheld computer. 3G wireless device 124B may include any device capable of sending and/or receiving 3G compatible data. For example, 3G wireless device 124B may include a 3G compatible cellular telephone, a 3G compatible laptop computer, and/or a 3G compatible application specific device, such as a remote monitoring device.

PSTN 126 may include any network capable of carrying plain old telephone system (POTS) compatible data. PSTN 126 may include central offices and/or switches for carrying data over "twisted pair" copper conductors and/or optical fibers. PSTN 126 may, at various points, accept and carry either analog signals or digital signals.

PSTN phone 128 may include any device capable of sending and receiving PSTN and/or POTS-compatible data. PSTN phone 128 may be implemented as a standalone device or may be incorporated with other devices, such as a desktop computer having a modem.

Network gateway 130 may include any device capable of converting PSTN and/or POTS compatible data to a format compatible with network 106, wireless LAN 102 and or 2G/3G wireless network 120. Network gateway 130 may include hardware and/or software for converting data from a PSTN format to a format compatible with network 106. Network gateway 130 may also include security devices and/or measures, such as firewalls.

SIP-enabled wireless and wireline devices, such as PDA 104, IP telephone 114 and/or socket 116, 2G phone 124A, and/or 3G phone 124B, may be configured to access all available networks using pertinent communication stacks and/or physical network ports associated with available networks. For example, communication stacks and/or physical network ports may be adapted to operate on data received from wireless LAN 102, network 106, 2G/3G wireless network 120, and/or PSTN network 128. Communication stacks may be implemented as software stacks using executable code including callable functions or invoked methods for parsing incoming and/or outgoing messages associated with a particular network protocol. For example, PDA 104 may include a communication stack for parsing a SIP datagram. Communication stacks may permit communication between a client device and one or more networks operating with one or more network protocols. SIP-enabled wireless and/or wireline devices consistent with implementations of the invention may initiate a handoff from one communication media, or mode, to another. The handoff may be initiated based on a location of a device, a user's preference, and/or the types of data exchanged during a communication session. A device may initiate change in communication modes upon detecting its proximity to a point of alternative communication modes or links or otherwise detecting availability of alternative communication modes or links.

Exemplary Device Architecture

Figure 2:
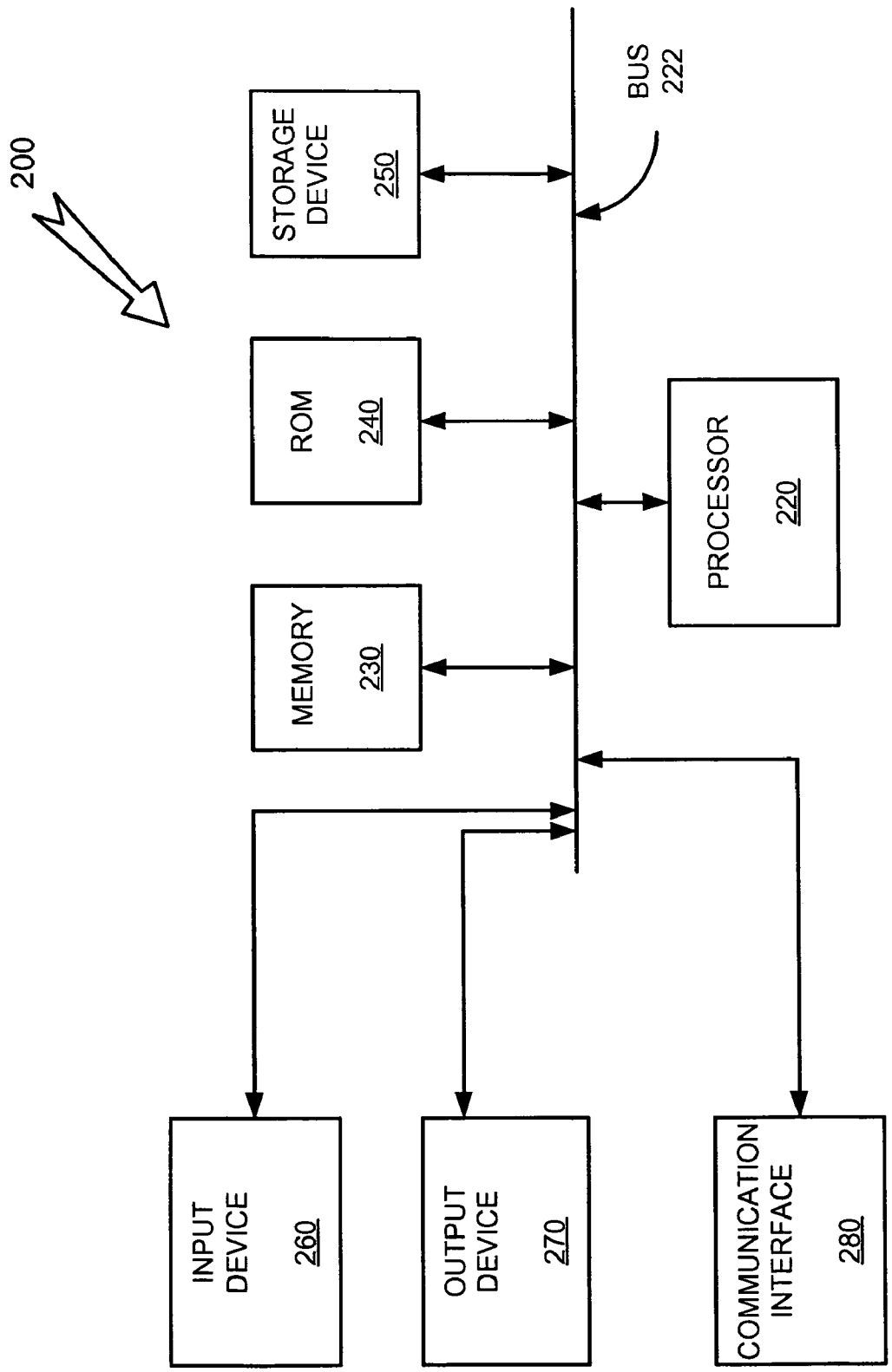
FIG. 2 illustrates an exemplary configuration of a general-purpose communication device that may be used for implementing embodiments of multimode communication devices consistent with the principles of the invention.

FIG. 2 illustrates an exemplary configuration of a general-purpose communication device that may be used for implementing embodiments of multimode communication terminal or endpoint devices consistent with the principles of the invention. Architecture 200 may be implemented in computers, network devices and/or non-multimode communication devices without departing from the spirit of the invention. The implementation illustrated in conjunction with FIG. 2 is exemplary and other configurations may alternatively be used.

Architecture 200 may include a processor 220, a bus 222, a memory 230, a read only memory (ROM) 240, a storage device 250, an input device 260, an output device 270, and a communication interface 280. Bus 222 permits communication among the components of architecture 200 and may include optical or electrical conductors capable of conveying data and instructions.

Processor 220 may include any type of conventional processor, microprocessor, or processing logic that may interpret and execute instructions, and may be implemented in a standalone or distributed configuration such as in a parallel processor configuration. Memory 230 may include a random access memory (RAM) or another type of dynamic storage device that stores information and instructions for execution by processor 220. Memory 230 may also be used to store temporary variables or other intermediate information during execution of instructions by processor 220.

ROM 240 may include a conventional ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions.

Input device 260 may include one or more conventional interfaces, components, and/or mechanisms that permit an operator to input information to architecture 200, such as a keyboard, a mouse, a pen, voice recognition and/or biometric mechanisms, etc. Output device 270 may include one or more conventional mechanisms that output information to an operator and may include a display, a printer, one or more speakers, etc. Communication interface 280 may include any transceiver-like mechanism that enables architecture 200 to communicate with other devices and/or systems. For example, communication interface 280 may include a modem or an Ethernet interface to a LAN, a wireless transceiver for coupling 3G device 124B to 2G/3G wireless network 120, etc.

Architecture 200 may perform processing in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices, carrier waves, or data structures, as instructions may be borne on any of these media. Execution of the sequences of instructions contained in memory 230 may cause processor 220 to perform certain acts that will be described hereafter in conjunction with method diagrams and signal flow diagrams. In alternative embodiments, hardwired circuitry may be used in place of or in combination with software instructions to implement functions performed by architecture 200. Yet other embodiments may involve such technologies as Field Programmable Gate Arrays (FPGAs), Application Specific Integrated Circuits (ASICs), dedicated chipsets, or firmware stored in non-volatile read-only memory. Thus, implementations consistent with the invention are not limited to any specific combination of hardware circuitry and software.

Those of ordinary skill in the art will recognize how various functions or operations described herein may be implemented in the context of FIG. 2. For example, communication interface 280 may monitor the availability or relative quality attributes of several potential access links or access modes. This information may be provided via bus 222 to processor 220, where a running process may decide whether switchover is to take place and may initiate switchover by sending signaling to the network as described in later figures. Processor 220 may also execute user interface applications or processes which use input device(s) 260 and output device(s) 270 to interact with the user and receive user preferences regarding switchover and to inform the user of proposed or actual switchover events. User preferences as to mode switchover may be persistently stored in storage device 250 or temporarily stored in memory 230. These preferences may be accessed by processor 220 as decisions are made affecting switchover.

Exemplary Software Configuration

Figure 3:
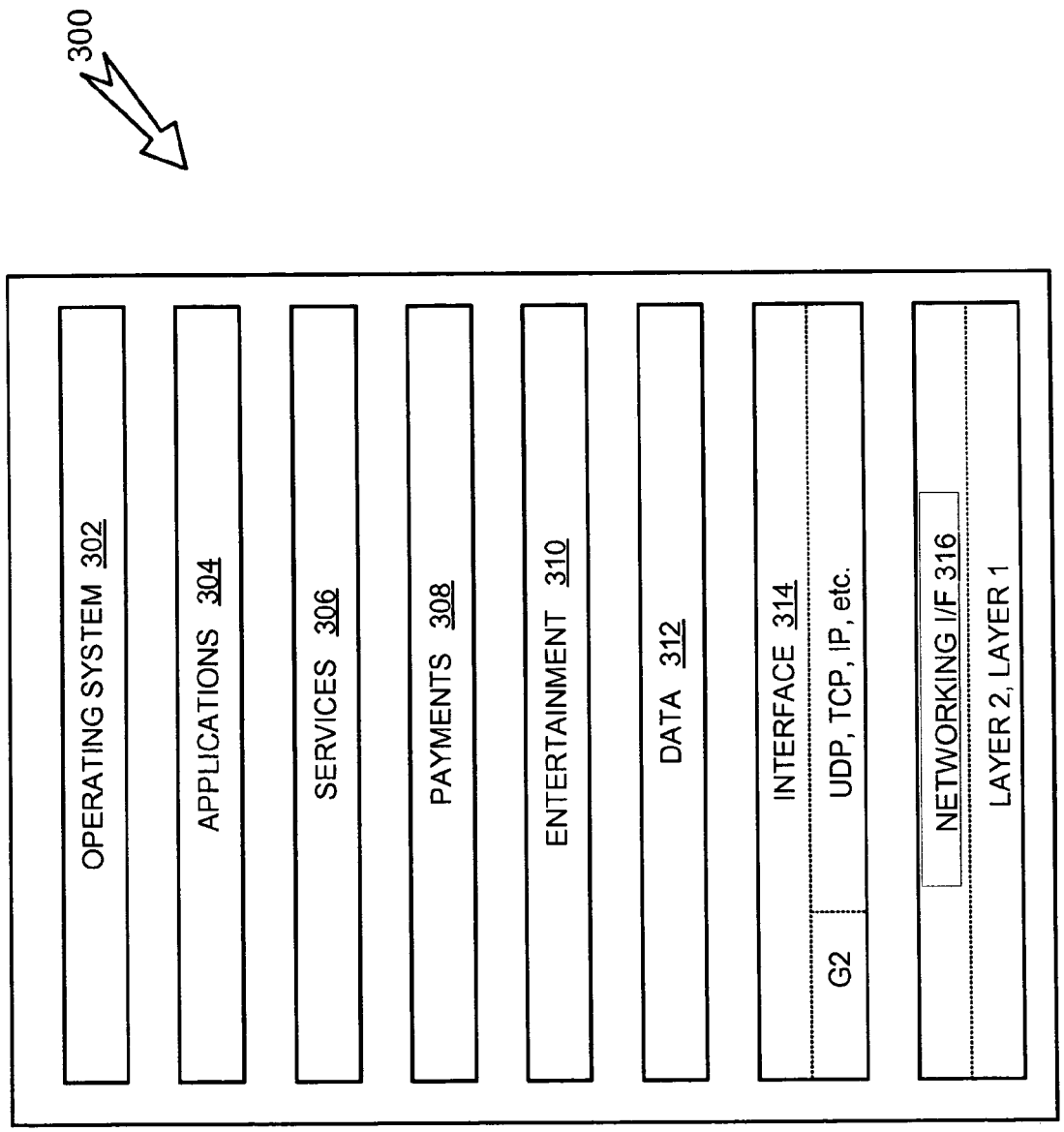
FIG. 3 illustrates an exemplary software configuration that may be implemented in multimode communication devices consistent with the principles of the invention.

FIG. 3 illustrates an exemplary software configuration that may be implemented in multimode communication devices consistent with the principles of the invention. Software configuration 300 may include, among other things, operating system 302, applications 304, services 306, payments 308, entertainment 310, data 312, interface 314, and networking 316. The exemplary software configuration of FIG. 3 may be configured to cause a multimode device to initiate a change from one communication mode to another during a communication session, especially while maintaining the session in a substantially active state. This avoids having to reestablish communications among the communicating parties whenever a change in access mode is to take place. Ideally, this mode change occurs with little disruption of user communications.

Operating system 302 may include software for controlling the overall operation and functioning of a wireless and/or wireline multimode communication device. For example, operating system 302 may control scheduling and interactions among applications operating on a wireless device. Operating system 302 may include functionality necessary for accepting user inputs, such as phone numbers, calendar entries, and/or voice messages. Operating system 302 may control and/or manage memory usage, interface usage, and/or diagnostic routines. Implementations of operating system 302 may be device specific and may vary depending on the manufacturer of a particular multimode communication device.

Applications 304 may include one or more software applications including machine-executable instructions for performing a function and/or series of functions, and/or operations. For example, an application may be directed to maintaining a calendar on a multimode communication device. Applications 304 may accept user input data and may further synchronize data with one or more remote applications resident on a server coupled to a network. In particular, some software-encoded applications or processes may act to solicit information from the user relative to access mode switching, inform the user when access mode switching will occur or has occurred, and make decisions or comparisons related to choosing whether to perform access mode switching.

Services 306 may include software having machine-executable instructions for facilitating communication between a multimode communication device and a destination device providing a service. For example, a service may be an e-mail service operated by a service provider. The e-mail service may operate to deliver messages to and/or receive messages from a wireless multimode communication device. Implementations of services 306 may include any type of service, such as a real-time traffic reporting capability for delivering traffic updates to a wireless device based on its location within a service network, real-time stock trading information, real-time weather forecast information based on a location of the multimode communication device, etc.

Payments 308 may include one or more software applications operating in conjunction with a multimode communication device for making and/or receiving a monetary transaction. For example, a wireless multimode device may run a payment application to make online bill payments via an interaction with a financial institution.

Entertainment 310 may include a software application for facilitating the transmission, receipt and/or display of entertainment related data. For example, an entertainment module may operate on an IP telephone 114 having an LCD display associated therewith for displaying movies ordered over a data communication network.

Data 312 may include one or more computer-readable data structures containing stored data. Data 312 may include computer-readable information associated with substantially any type of application and/or subject. For example, data 312 may include computer-readable information dealing with signal strength measurement data received at a wireless multimode communication device. For example, a wireless multimode device may record received signal strengths from one or more wireless networks. The wireless multimode device may determine which of the wireless networks should be used for a communication session based on the signal strength data.

Interface 314 may include software to facilitate communication with a network using one or more communication protocols. Interface 314 may include machine-readable instructions for converting outgoing data on a wireless device into a format compatible with a given network. For example, interface 314 may include software that converts outgoing data on 2G wireless device 124A into a format compatible with 2G/3G wireless network 120. Interface 314 may convert incoming data into a format compatible with 2G wireless device 124A. Interface 314 may include instructions for facilitating communication using user datagram protocol (UDP), transmission control protocol (TCP), IP, as well as other protocols. Interface 314 may include one more communication stacks for parsing received datagrams. A communication stack may extract data from incoming datagrams and make the extracted data available to other software routines operating on a multimode communication device.

Networking interface 316 may include machine-readable instructions for implementing portions of the open system interconnection (OSI) model, namely OSI layers. For example, networking interface 316 may facilitate implementation of the physical layer (layer 1) and/or data link layer (layer 2) of the OSI model for allowing a multimode communication device to communicate with a network running a particular networking protocol. Networking interface 316 may operate in conjunction with hardware such as a network interface card (NIC). Networking interface 316 may operate to cause a multimode device to change from one communication mode to another based on an instruction initiated by a multimode device and/or a user thereof.

Multimode communication devices may include other software functionality as necessary for accommodating the needs of users and/or integration with various network types. Furthermore, multimode communication devices may employ software in a standalone mode, where an entire software application is resident on the communication device, and/or in a distributed mode, where a portion of the software is resident on the communication device while the remaining software is accessed remotely using a network connection.

Exemplary Communications Socket

Figure 4:
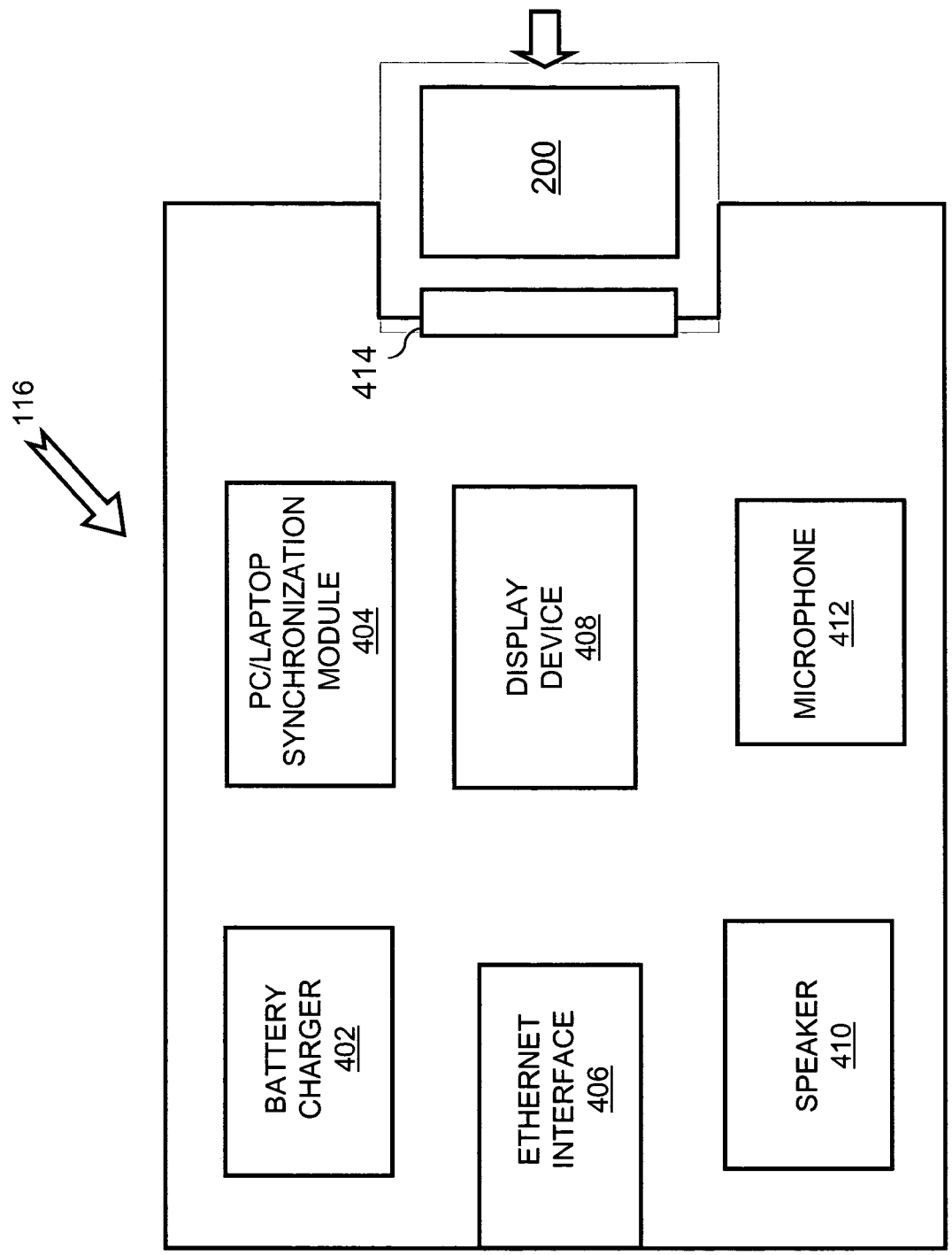
FIG. 4 illustrates an exemplary implementation of a socket for accommodating a multimodal communication device consistent with the principles of the invention.

FIG. 4 illustrates an exemplary implementation of a multimode socket for coupling with a multimode communications device. In some designs consistent with the present invention, the communication device may physically 'nest' into, or mechanically couple to, the socket, although it should be understood that this is not a requirement in accordance with the present invention. The communications device may also achieve some electrical connection with the socket when coupled thereto. The electrical connection may provide for analog or digital signals as well as direct current flow, which may be useful for power in the device and/or recharging batteries of the device. The communications device may also, or alternatively, employ short-range radio signals or optical signals to pass communications via the socket. In figure four, a multimode communications device 200 is shown be coupled to socket 116 through interface 414. Interface 414 may comprise any mixture of mechanical, electrical, electromagnetic or optical couplings as needed for a given design.

Socket 116 may include, among other things, a battery charger 402, a PC/laptop synchronization module 404, an Ethernet interface 406, a display device 408, a speaker 410 and/or a microphone 412.

Battery charger 402 may include any device capable of recharging a battery. Battery charger 402 may be configured and arranged to operate as a cradle for accepting a communication device, such as 2G wireless device 124A. Battery charger 402 may recharge a battery associated with 2G wireless device 124A and may include electrical components and/or optical media for communicating data to and/or receiving data from 2G wireless device 124A while charging. For example, a high bandwidth optical fiber in socket 116 may removeably couple to a corresponding optical fiber connector associated with 2G wireless device 124A when mounted on battery charger 402. 2G wireless device 124A may be capable of participating in high bandwidth multimode communications with a remote device via CPE interface 110 and socket 116 while engaged with battery charger 402. Alternatively, 2G wireless device 124A may communicate with socket 116 using a free-space wireless protocol such as Bluetooth.

PC/laptop synchronization module 404 may communicate with mobile device 200 (such as a PDA) to enable synchronization and reconciliation of e-mail files, calendar data and address book data among the mobile device 200 and the relatively fixed PC or laptop computer. A laptop may communicate with socket 116 using a hardwired connection or a free space link such as an infrared link and/or a short-range wireless link.

Ethernet interface 406 may include a connector and/or logic for communicatively coupling socket 116 to IP telephone 114 and/or directly to CPE interface 110 to provide the mobile device a direct LAN connection as an available mode of access. Ethernet interface 406 may include an industry standard RJ-45 receptacle for removeably coupling socket 116, to an Ethernet network, for example.

Display device 408 may include any type of display, such as a color liquid crystal display (LCD), to provide a display capability to a device, such as 2G wireless device 124A. Display device 408 may facilitate display of high resolution video and/or images while 2G wireless device 124A is operatively coupled to socket 116.

Speaker 410 and/or microphone 412 may provide speakerphone and/or enhanced audio capabilities to a device, such as 2G wireless device 124A, while operatively coupled to socket 116. For example, 2G wireless device 124A may provide identification information to SIP mobility server 108 using socket 116 so that a user associated therewith can participate in a video conference requiring greater bandwidth than that provided by a 2G wireless network. Socket 116 may be configured to allow a conventional device and/or a multimode device to initiate a change from one type of media session to another during a communication session. Socket 116 may perform necessary communications with network devices to facilitate the change in media types or media parameters (bandwidth, codec scheme, resolution, etc.).

Exemplary System for SIP-Based Mobile Communication

Figure 5:
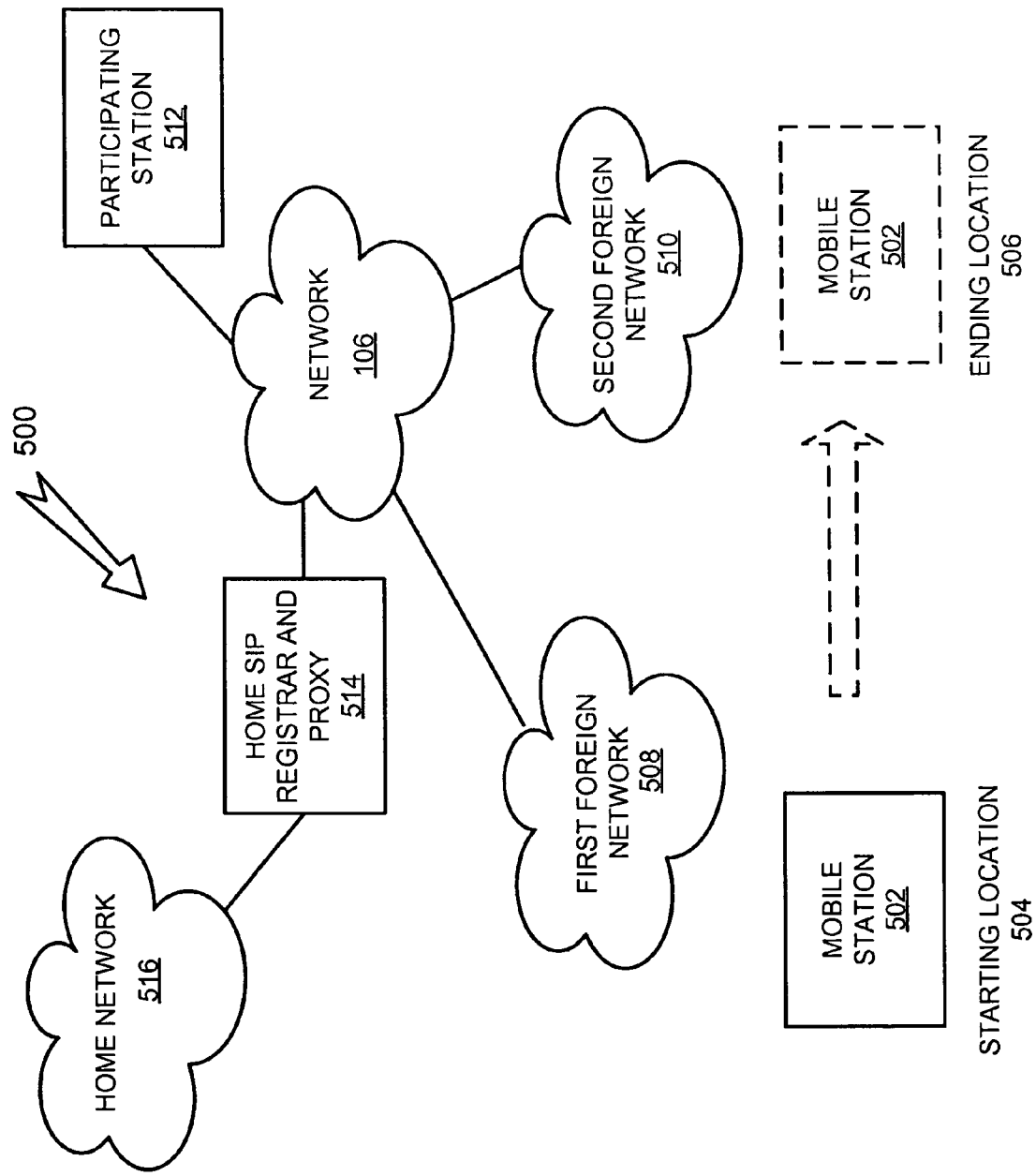
FIG. 5 illustrates an exemplary system to facilitate communication with a mobile station traversing across multiple networks while participating in a SIP based communication session consistent with the principles of the invention.

FIG. 5 illustrates an exemplary system to facilitate communication with a mobile station traversing across multiple networks while participating in a SIP based communication session consistent with the principles of the invention. For example, a mobile station participating in a communication session may traverse from a first network operating with a first network protocol to a second network operating with a second network protocol without interrupting the communication session. The first network and the second network may both be wireless networks with the first network being a cellular network and the second network being a wireless-IP network, such as a Wi-Fi network. Implementations consistent with the principles of the invention may allow a mobile station to traverse from the first network to the second network without interrupting an ongoing communication session taking place between the mobile station and a destination device. Implementations consistent with the principles of the invention may let a mobile device initiate a change from one network to another and/or from one communication mode to another.

System 500 may include network 106, a mobile station 502 having a starting location 504 and an ending location 506, a first foreign network 508, a second foreign network 510, a participating station 512, a home registrar and proxy server 514 (hereinafter home SIP registrar 514), and a home network 516.

Network 106 may include a network substantially similar to network 106 described in conjunction with FIG. 1. In one implementation, network 106 is a public network, such as the Internet.

Mobile station 502 may include any wireless device capable of participating in a multimode communication session. Mobile station 502 may commence a SIP based communication session with participating station 512 via first foreign network 508 at starting location 504. While engaged in communication via first foreign network 508, mobile station 502 may move toward a second foreign network 510. Second foreign network 510 may be positioned and may be capable of communicating with mobile station 502 at an ending location 506. First foreign network 508 and second foreign network 510 may be operatively coupled to network 106 via a gateway.

Mobile station 502 may be configured to initiate a transition from first foreign network 508 to second foreign network 510. Mobile station 502 may request the change based on one or more attributes by which the two networks may be compared. These relative attributes may include, for example, signal strength or signal/noise ratio, bit error rate, bandwidth, physical proximity, quality, reliability, cost, level of security, capabilities supported.

In some implementations, user preferences may affect how these attributes are weighed into the decision to switch from one network to another or one mode of access to another. For example, a user may express a threshold at which the differences between the networks are compelling enough to justify switchover. Alternatively or additionally, a user preference may be expressed and carried out in terms of a given mode of access or identity of given network that is preferred over another. These preferences may be specified well before, and outside the context of, any particular communications sessions.

User preferences may be maintained in persistent storage or non-volatile memory in the mobile device. User preferences may be retained at a point remote from the device and made available to the device as needed or upon power-up or registration of the device with a network.

In a semi-automatic mode, the device may determine that a viable or desirable alternative network or mode of access is available and then prompt the user for permission to perform the switching. This approach allows the user to participate in the decision and to even control the timing of the switchover to coincide with a break in the conversation, for example. Upon receiving the user's decision to proceed, the device then performs signaling, as described later herein, to initiate the switchover.

Whether or not user preferences are considered for switchover decisions and whether or not the user input is solicited in 'real time' during a session, the device may notify the user that such switchover has taken place or will be taking place. This may enhance the user's awareness of mid-session switching. It is envisioned that the notification from the device may be in the form of visual or audible stimulus or even mechanical motion, such as a momentary vibration. For example, a person using a mobile telephone as a handset in the vicinity of their ear and mouth may not be able to see the display, but could receive a slight vibration during a conversation, the vibration having a characteristic pattern and subtly indicating that access mode switching has occurred. The user may want to be aware of shifts in cost or of when momentary signal interruption may have occurred affecting the reception of spoken words through the connection.

When executing a mid-session mode switchover, the device may signal to the user when the new connection has been successfully established. Alone or in conjunction with other interactions described above, this feature may be useful in some implementations for clarifying to the user when they have achieved a reliable connection after switchover.

It is possible to combine some of the above approaches. The device may employ user preferences configured beforehand to affect whether an alternative connection is adequate to considering switchover and then prompt the user for permission to execute the switchover.

User preferences affecting switchover from one access mode to another or one network to another may be entered in a variety of ways. The user may enter preferences into the device directly, such as by interaction with a user interface application presented by the device (such as an application 304). Beforehand user preferences may be entered through, for example, a web site which is able to populate a user profile which may then be made available to the device and/or the network for making switchover decisions. Real-time conditions, such as detected wireless signals, may be evaluated relative to criteria either entirely within the device or cooperatively with other elements.

Depending upon implementation, user preferences may be simple or detailed. One form of user preference may simply express whether the mobile device is enabled to perform automatic or semi-automatic switching of access modes. Alternatively, user preferences may express detail as to criteria or threshold conditions under which mode switching is to take place. The present invention is not limited in scope to a particular one of these variations and which variations are deployed in practice adopted may be a matter of design choice.

One aspect of user preferences which may be useful in some situations is a time delay or persistence value. This value relates to the interval of time that an alternative link, network or mode of access must be persistently detected as being available before the device will consider it as a candidate for subsequent communications. This avoids undesirable transient switchovers that might occur when a mobile user momentarily passes by public WiFi hotspots, for example.

The time delay may be programmable by the user, even to the extent of having differentiated thresholds as a function of network type, network identity, etc.

Continuing to refer to FIG. 5, first foreign network 508 and second foreign network 510 may include any type of wireless network capable of sending data to a mobile station and/or capable of receiving data from a mobile station. First and second foreign networks 508, 510 may operate using a single wireless networking protocol or may operate using different wireless networking protocols. First and second foreign networks 508, 510 may receive data from network 106 and/or make data available to network 106. For example, first foreign network 508 may receive a dialed number associated with a called party from mobile station 502. First foreign network 508 may make the dialed number available to network 106 so that home SIP registrar 514 can determine a location associated with the called party in order to complete the call on behalf of mobile station 502.

Participating station 512 may include any device capable of sending data to a network and/or capable of receiving data from a network. Participating station 512 may include communication devices such as PDA 104, handheld computer 118, 2G wireless device 124A, and/or PSTN phone 128. Participating station 512 may operate as a source device when making a call and/or as a destination device when receiving a call.

Home SIP registrar 514 may include any device capable of being configured and operated as a home location registrar on a network. Home SIP registrar 514 may be implemented in a standalone configuration and/or may be combined with SIP mobility server 108. Home SIP registrar 514 may be coupled to home network 516 and/or to network 106. Home SIP registrar 514 may operate to affect communications between mobile station 502 and/or the respective networks over which mobile station 502 may communicate. Home SIP registrar 514 may perform functions, such as determining optimum paths for conveying data from mobile station 502 to one or more participating stations 512. For example, home SIP registrar 514 may facilitate a handoff from first foreign network 508 to second foreign network 510 using network layer 2, as mobile station 502 reaches the edge of a coverage area associated with first foreign network 508. Home SIP registrar 514 may further connect mobile station 502 with home network 516.

Home network 516 may include a primary network associated with mobile station 502. Home network 516 may be configured to receive data from a communication device when the device is associated with a location that is within a coverage area of home network 516.

Communication may take place, using system 500, when mobile station 502 sends a SIP-compliant INVITE, or re-INVITE, request to first foreign network 508. The INVITE request may operate as a request to have a destination device participate in a communication session with mobile station 502. The INVITE request may include a 'Contact' header field and an updated Session Description Protocol (SDP) that may define a text-based format for describing a streaming media session and/or multicast transmission. First foreign network 508 may issue a message, such as a 200 OK response, to indicate that an INVITE request has been received and understood.

Mobile station 502 may issue an acknowledgement, such as an ACK response to confirm that it has received the 200 OK response. Mobile station 502 may send data to, and/or receive data from, first foreign network 508 after sending the acknowledgement. For example, a SIP-enabled communication session may take place using the data exchanged between mobile station 502 and first foreign network 508, after the INVITE, 200 OK, and ACK message exchange has occurred.

The INVITE, 200 OK, and ACK syntax for establishing a communication session may be used by other devices in system 500. For example, first foreign network 508 may send an INVITE request to network 106, network 106 may send a 200 OK response to first foreign network 508, and first foreign network 508 may send an acknowledgement to network 106. After the above exchange, first foreign network 508 and network 106 may exchange communication data as part of a communication session. Devices associated with implementations of the invention may use SIP for negotiating parameters associated with fixed and/or mobile communication sessions.

Exemplary Method for SIP-Based Communication

Figure 6:
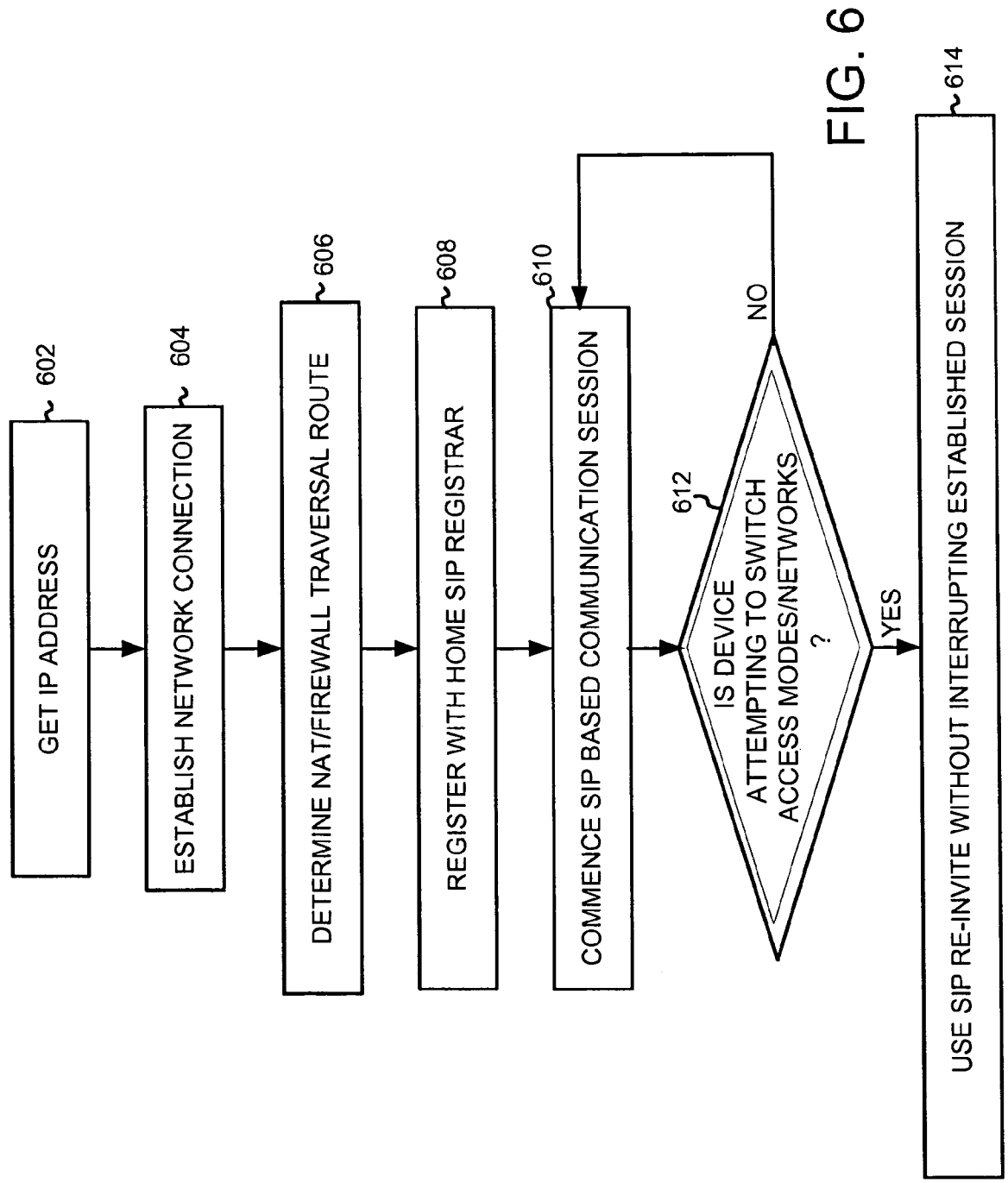
FIG. 6 illustrates an exemplary method for facilitating full featured IP communications using SIP based services consistent with the principles of the invention.

FIG. 6 illustrates an exemplary method for facilitating full featured IP communications using SIP-based services consistent with the principles of the invention. The method may commence when a mobile device, such as mobile station 502, requests an IP address using dynamic host configuration protocol (DHCP) (act 602). Mobile station 502 may request an IP address so that it has a network identifier that can be used for establishing its identity on one or more networks. Mobile station 502 may establish a network connection and may commence communication using the obtained IP address (act 604). For example, an IP address may operate to identify mobile station 502 to other devices on a network. Network devices such as routers, firewalls and/or switches may use the IP address for allowing data sent from mobile station 502 to pass across a network. Network devices may also use the IP address to deliver data to mobile station 502. An optimum NAT/firewall traversal route may be determined using techniques known in the art (act 606). For example, a traversal route may be determined using ICE, STUN, TURN and/or realm-specific IP (RSIP).

Mobile station 502 may register with its home SIP registrar (act 608). For example, mobile station 502 may register with home SIP register 514. Registration may operate to provide the home SIP registrar with information regarding the identity of the mobile station 502 and/or its current location. Registration may also include an exchange of information about a configuration associated with mobile station 502. For example, registration may provide home SIP registrar 514 with information about the types of media sessions that mobile station 502 can support.

Mobile station 502 may commence full SIP-based IP communication over a network (act 610). Mobile station 502 may commence a communication session with participating station 512. For example, home SIP registrar 514 may include a network identifier associated with participating station 512. Mobile station 502 may issue an INVITE request to participating station 512 to request that participating station 512 join a communication session with mobile station 502. Home SIP registrar 514 may receive the INVITE request from mobile station 502 and forward the request to participating station 512. Participating station 512 may send a 200 OK response to mobile station 502 via home registrar 514 to acknowledge that the INVITE request was received. Mobile station may send an acknowledgement message, such as an ACK message, directly to participating station 512 to acknowledge receipt of the 200 OK message. Mobile station 502 may send the ACK message directly to participating station, without passing through home SIP registrar 514, because mobile station 502 may have obtained the network identifier for participating station 512 from the 200 OK message received via home registrar 514.

Home SIP registrar 514 and/or one or more traversed networks may operate to determine if mobile station 502 is attempting to switch between two networks (act 612). For example, home SIP registrar 514 may operate with first foreign network 508, second foreign network 510 and/or network 106 to determine if mobile station 502 is making a request and/or attempting to switch from first foreign network 508 to second foreign network 510. If first foreign network 508 or second foreign network 510 detect that mobile station 502 is attempting to switch networks, first foreign network 508 and/or second foreign network 510 may contact home SIP registrar 514. First foreign network 508 and/or second foreign network 510 may inform home SIP registrar 514 that mobile station 502 is moving from one network to another.

When mobile station 502 is attempting to switch networks, a SIP re-INVITE request may be issued without causing any interruption in the established Internet communication session (act 614). For example, mobile station 502 and/or second foreign network 510 may issue a re-INVITE request to home SIP registrar 514. Mobile station 502 may send the re-INVITE request automatically and/or a user of mobile station 502 may manually cause the re-INVITE request to be sent. The re-INVITE request may be used by home SIP registrar 514 to continue the communication session using second foreign network 510 instead of first foreign network 508. For example, home SIP registrar 514 may operate alone or with other network devices to transition the portion of a communication session traversing first foreign network 508 onto second foreign network without interrupting the communication session. In contrast, if mobile station 502 is not trying to switch networks, method flow may return to act 610.

Implementations consistent with the principles of the invention make it possible for mobile station 502 to move from first foreign network 508 to second foreign network 510 without suffering any interruption in an ongoing communication session. Furthermore, a user of mobile station 502 may not have to perform any manual operations with respect to maintaining connectivity during the session since system 500 may perform routing and switching automatically. In addition, an implementation may employ a single home SIP registrar 514 thus alleviating the need for employing a visiting SIP registrar. Use of a single SIP registrar may ensure that seamless communication sessions are possible.

Exemplary Authentication and Registration Call Flow

Figure 7:
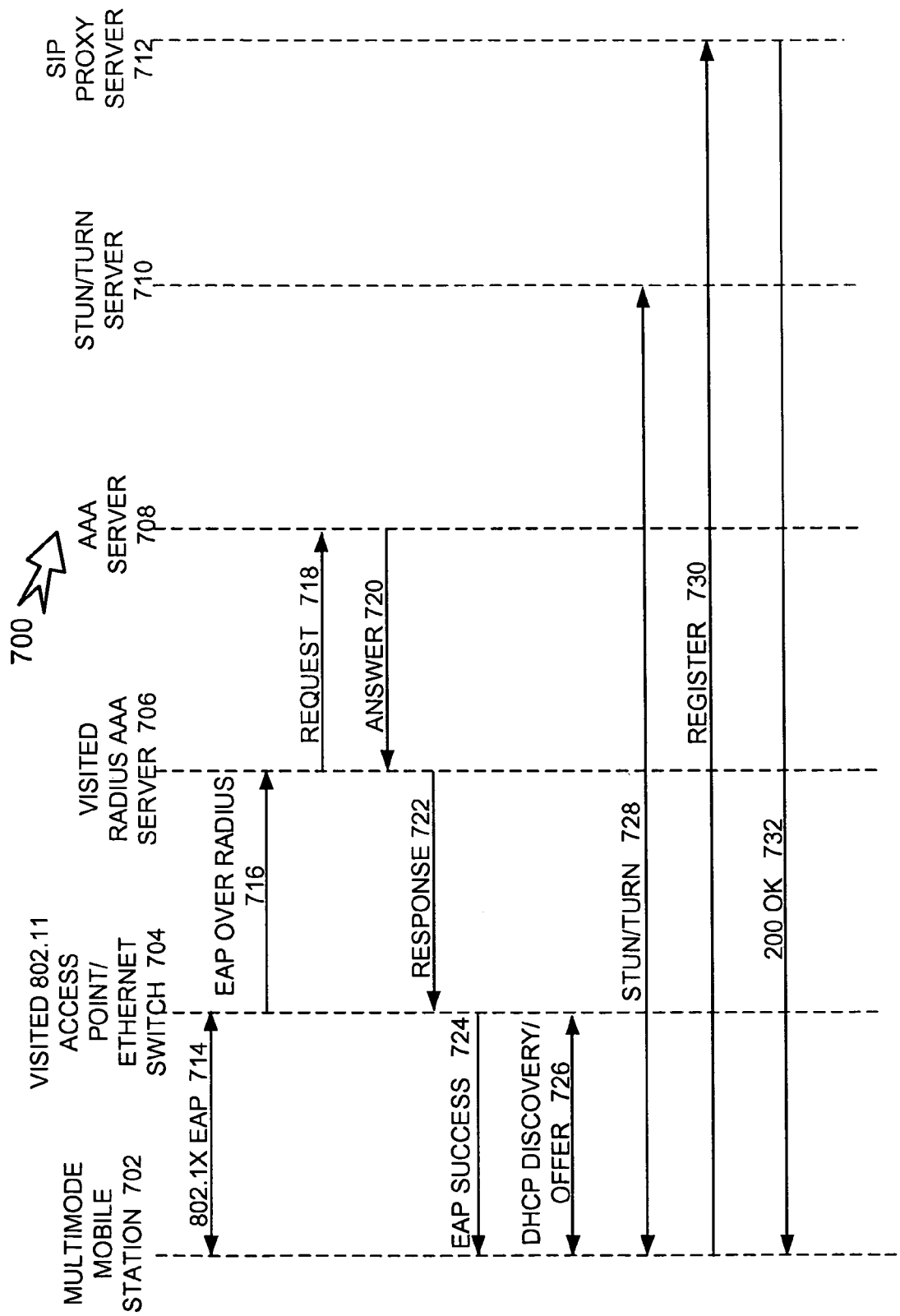
FIG. 7 illustrates an exemplary call flow that may be used to perform authentication and registration in an IP network to provide fixed-mobile converged communication services consistent with the principles of the invention.

FIG. 7 illustrates an exemplary call flow that may be used to perform authentication and registration in an IP network to provide fixed-mobile converged communication services consistent with the principles of the invention. Call flow 700 may take place among a multimode mobile station 702, a visited access point/Ethernet switch 704, a visited RADIUS/AAA server 706, an AAA server 708, a STUN/TURN server 710 and a SIP proxy server 712.

Multimode mobile station 702 (hereinafter mobile station 702) may include any device capable of supporting more than one mode of wireless communication. For example mobile station 702 may include mobile station 502. Visited access point/Ethernet switch 704 (hereinafter access point 704) may include any device capable of operating as a wireless access point in a network. For example, access point 704 may be included in 2G/3G wireless network 120, first foreign network 508 and/or second foreign network 510. Visited radius AAA server 706 (hereinafter visited server 706) may include any device capable of performing authentication, authorization and accounting (AAA) services and/or remote authentication dial-in user service (radius). Visited server 706 may allow remote access servers to access a central server for authorizing users of a network. Visited server 706 may operate with one or more databases containing user information when performing authorization operations. Visited server 706 may be implemented as a standalone device and/or may be incorporated into the functionality of another device, such as SIP mobility server 108 and/or home SIP registrar 514. AAA server 708 may include any device capable of performing AAA services. STUN/TURN server 710 may include any device capable of performing simple traversal of UDP through NAT's (STUN) and/or traversal using relay NAT (TURN) services. STUN/TURN server 710 may operate to facilitate network traversal of signaling and/or messaging data associated with facilitating communication sessions between a source device and a destination. AAA server 708 and/or STUN/TURN server 710 may be implemented as network devices operating in network 106, wireless gateway 122 and/or network gateway 130. SIP proxy server 712 may include any device capable of facilitating SIP based communication sessions. For example, SIP proxy server 712 may be implemented as part of SIP mobility server 108 and/or home SIP registrar 514. SIP proxy server may operate to forward SIP messages on behalf of a source device and/or a destination device associated with a communication session.

Mobile station 702 may issue an extensible authentication protocol (EAP) message 714 in an IEEE 802.1x format that is compatible with a wireless network protocol to initiate a communication session. EAP may be used to assist a network device with selecting an appropriate network access identifier (NAI). An NAI may be an identifier for use in establishing the identity of a device on a network. An NAI may identify a roaming device that may not be associated with its home network.

A compatible IEEE 802.1x access point 704 may receive an EAP message 714 and may forward EAP message 716 via a radius compatible format to visited server 706. Visited server 706 may send a request 718 to AAA server 708. Request 718 may indicate that mobile station 702 desires to register with a network. AAA server 708 may send an answer 720 to visited server 706 in response to request 718. Visited server 706 may generate a response 722 that is sent to access point 704. Response 722 may be generated as a result of EAP message 716. Access point 704 may pass an EAP success message 724 to mobile station 702. EAP success message 724 may indicate that a request to register was acknowledged.

Mobile station 702 may send a DHCP discovery/offer message 726 to access point 704. A STUN/TURN protocol compliant path 728 may be established between mobile station 702 and STUN/TURN server 710. Mobile station 702 may send a register request 730 to SIP proxy server 712. SIP proxy server 712 may send a 200 OK response 732 indicating that the register request 730 was received and understood. SIP proxy server 712 may operate to register mobile station 702 on a network, such as network 106, using signal flow 700. After registering on a network, mobile station 702 may be able to participate in multimode communication sessions with a destination device.

Exemplary Mobile Station to PSTN Call Flow

Figure 8:
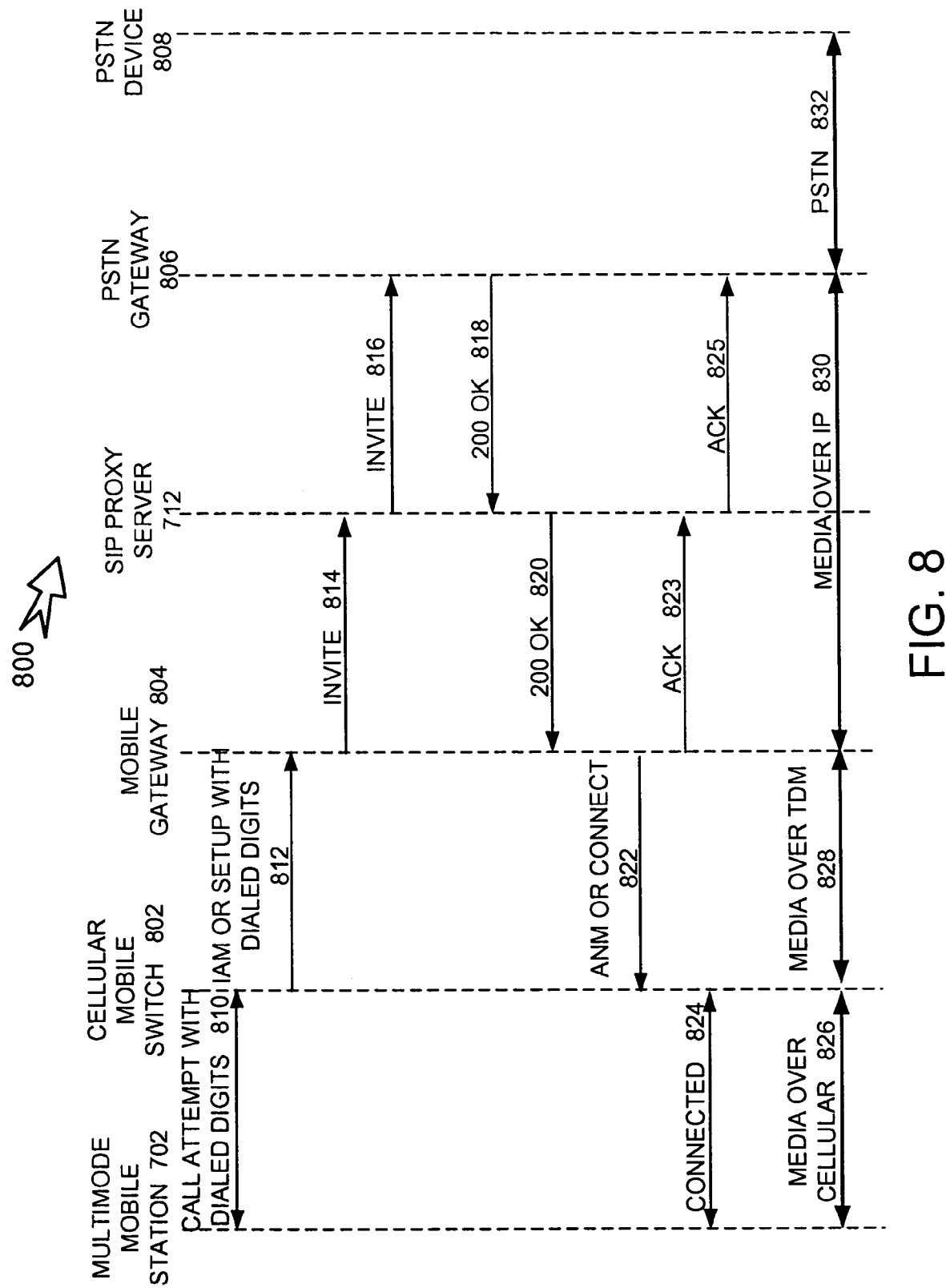
FIG. 8 illustrates an exemplary call flow that may be used for completing a call from a mobile station to a PSTN device consistent with the principles of the invention.

FIG. 8 illustrates an exemplary call flow that may be used for completing a call from a mobile station to a PSTN device consistent with the principles of the invention. Call flow 800 may take place among a multimode mobile station 702, a cellular mobile switch 802, a mobile gateway 804, a SIP proxy server 712, a PSTN gateway 806 and a PSTN device 808.

Mobile station 702 and SIP proxy server 712 may be configured substantially as described in conjunction with FIG. 7. Cellular mobile switch (hereinafter mobile switch 802) may include any device capable of facilitating the setup of a wireless call. For example, mobile switch 802 may operate as part of first foreign network 508 and/or second foreign network 510 to process an outgoing string of digits associated with the identity of a called party. Mobile gateway 804 may include any device capable of interfacing a wireless network with another network. For example, mobile gateway 804 may be configured to operate in a manner substantially similar to wireless gateway 122 discussed in connection with FIG. 1. PSTN gateway 806 may include any device capable of interfacing a PSTN network with another network. In one implementation, PSTN gateway 806 may be configured to operate in a manner substantially similar to network gateway 130 discussed in connection with FIG. 1. PSTN device 808 may include any device capable of making or receiving PSTN calls. In one implementation, PSTN device 808 may be configured to operate in a manner substantially similar to PSTN phone 128.

Call flow 800 may commence when mobile station 702 issues a call attempt using a string of dialed digits 810. Mobile switch 802 may receive dialed digits 810 and construct an initial address message (IAM), or setup message, 812. IAM 812 may include the dialed digits received from mobile station 702. Mobile switch 802 may send IAM 812 to mobile gateway 804. Mobile gateway 804 may send an INVITE request 814 to SIP proxy server 712. INVITE request 814 may operate as a request to have a destination device, such as PSTN device 808, participate in a calling session with mobile station 702. SIP proxy server 712 may forward INVITE request 814 to PSTN gateway 806 as INVITE request 816.

PSTN gateway 806 may issue a 200 OK response 818 indicating that INVITE request 816 was received and understood. SIP proxy server 712 may receive 200 OK response 818 and may generate 200 OK response 820 and send it to mobile gateway 804 to indicate that INVITE request 814 was received and understood. Mobile gateway 804 may send an ANM or connect message 822 to mobile switch 802. Mobile switch 802 may issue a connect message 824 to mobile station 702. Mobile station 702 may communicate over the network with media over cellular data 826. Mobile station 702 may transmit media over cellular data 826 to mobile switch 802. Mobile switch 802 may pass media data 828 to mobile gateway in a TDM format. Mobile gateway 804 may convert media data 828 to an IP format 830 and may convey the data to PSTN gateway 806. PSTN gateway 806 may provide media data to PSTN device 808 in a PSTN compatible format 832.

Exemplary PSTN to Mobile Station Call Flow

Figure 9:
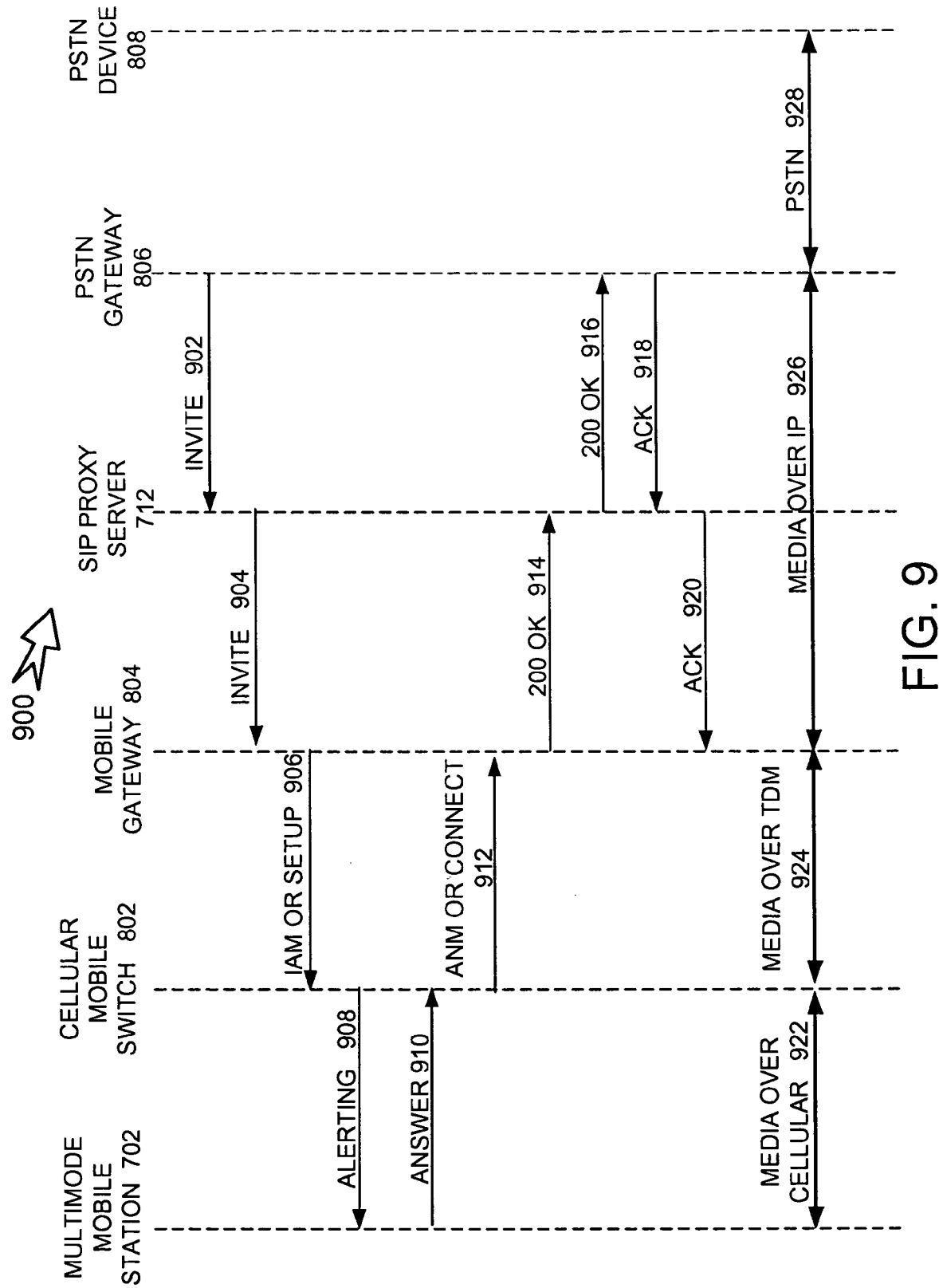
FIG. 9 illustrates an exemplary call flow originating with a PSTN device and terminating at a mobile station consistent with the principles of the invention.

FIG. 9 illustrates an exemplary call flow originating with a PSTN device and terminating at a mobile station consistent with the principles of the invention. Call flow 900 may use mobile station 702, mobile switch 802, mobile gateway 804, SIP proxy server 712, PSTN gateway 806 and PSTN device 808. Mobile station 702, mobile switch 802, mobile gateway 804, SIP proxy server 712, PSTN gateway 806 and PSTN device 808 may be configured as previously described.

PSTN gateway 806 may send an INVITE request 902 to SIP proxy server 712. SIP proxy server 712 may forward INVITE request 902 to mobile gateway 804 as INVITE request 904. Mobile gateway 804 may send an IAM or setup message 906 to mobile switch 802. Mobile switch 802 may send an alerting signal 908 to mobile station 702. An alerting signal may include, for example, a ring tone.

Mobile station 702 may issue an answer 910 based on alerting signal 908. For example, a user may respond to alerting signal 908 by answering the phone. Alternatively, an alerting signal 908 may be addressed by having an answering machine and/or voice mail system pick up the incoming signal. Mobile switch 802 may receive answer 910. Mobile switch 802 may issue an ANM or connect message 912. Mobile gateway 804 may receive ANM or connect message 912 and may send a 200 OK response 914 to SIP proxy server 712. 200 OK response 914 may indicate that INVITE request 904 was received and understood. SIP proxy server 712 may send a 200 OK response 916 to PSTN gateway 806 indicating that INVITE request 902 was received and understood.

PSTN gateway 806 may respond to 200 OK response 916 by sending an acknowledgement response ACK 918 to SIP proxy server 712. SIP proxy server 712 may send an acknowledgement response as ACK 920 to mobile gateway 804 indicating that 200 OK response 914 was received and understood. When mobile gateway 804 receives ACK 920, a media over cellular call 922 may be enabled. Mobile switch 802 may pass cellular media data 922 to mobile gateway 804 in a TDM format 924. Mobile gateway 804 may pass media over IP 926 to PSTN gateway 806 which in turn may convey the data to PSTN device 808 in a PSTN format 928.

Exemplary Mode Switching 2G to IP Mode Call Flow

Figure 10:
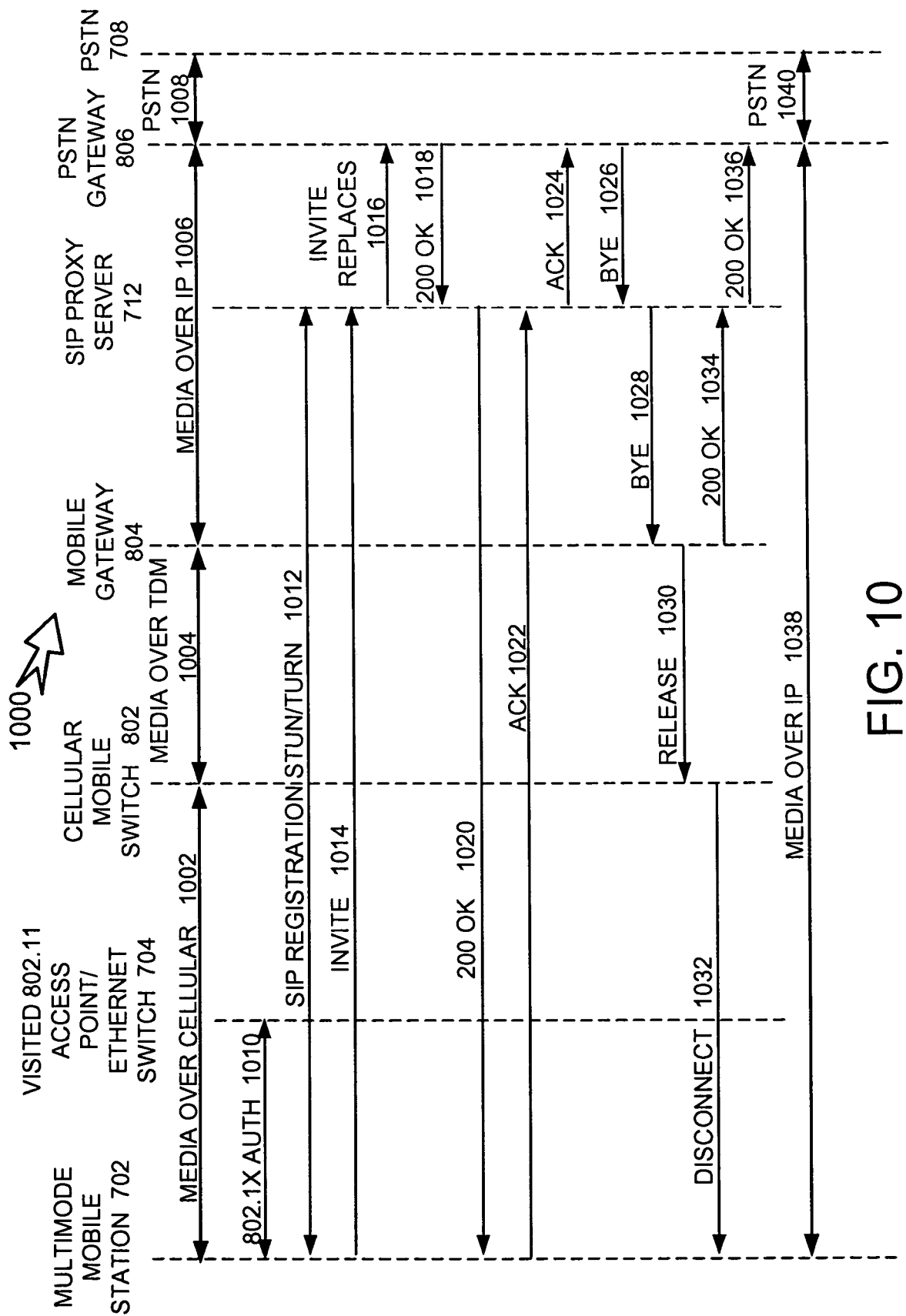
FIG. 10 illustrates an exemplary call flow originating at a 2G mobile station and terminating at a PSTN device after transmission in an IP mode consistent with the principles of the invention.

FIG. 10 illustrates an exemplary call flow originating at a 2G mobile station and terminating at a PSTN device after transmission in an IP mode consistent with the principles of the invention. Call flow 1000 may include a mobile station 702, an access point 704, a mobile switch 802, a mobile gateway 804, a SIP proxy server 712, a PSTN gateway 806 and a PSTN device 808. Mobile station 702, access point 704, mobile switch 802, mobile gateway 804, SIP proxy server 712, PSTN gateway 806 and PSTN device 808 may operate as previously described.

An implementation of call flow 1000 may initially include media over cellular 1002, media over TDM 1004, media over IP 1006 and media over PSTN 1008. During a call, call flow 1000 may transition so as to include media over IP 1038 and PSTN media 1040. The transition may occur as a result of a request made by a mobile device, such as mobile station 702.

Call flow 1000 may commence when an 802.1x authorization message 1010 is exchanged between mobile station 702 and access point 704. A SIP registration STUN/TURN message 1012 may be exchanged between mobile station 702 and SIP proxy server 712. SIP registration STUN/TURN message 1012 may traverse one or more NATs and/or firewalls en route to SIP proxy server 712. Mobile station 702 may issue an INVITE request 1014 to SIP proxy server 712. INVITE request 1014 may operate as a request, or invitation, to a destination device to join a calling session with mobile station 702, such as media over IP session 1038. SIP proxy server 712 may send INVITE request 1016 to PSTN gateway 806. INVITE request 1016 may include a 'Replaces' header that may include information associated with transitioning the ongoing communication session to media over IP 1038.

PSTN gateway 806 may respond to INVITE request 1016 with a 200 OK response 1018 indicating that the INVITE request was received and understood. SIP proxy server 712 may send a 200 OK response 1020 to mobile station 702.

Mobile station 702 may send an acknowledgement (ACK) response 1022 to SIP proxy server 712 to acknowledge receipt of 200 OK response 1020. SIP proxy server 712 may send an ACK response 1024 to PSTN gateway 806. ACK response 1024 may indicate that 200 OK response 1018 was received and understood.

PSTN gateway 806 may send a BYE request 1026 to SIP proxy server 712 to terminate a portion of the communication session. SIP proxy server 712 may send a BYE request 1028 to mobile gateway 804. Mobile gateway 804 may send a release message 1030 to mobile switch 802. Release message 1030 may be associated with releasing, or terminating, a portion of the current communication session. Mobile switch 802 may send a disconnect message 1032 to mobile station 702. Disconnect message 1032 may cause a portion of the calling session to terminate. When mobile gateway 804 receives BYE request 1028, it may return 200 OK response 1034 to SIP proxy server 712. SIP proxy server 712 may send a 200 OK response 1036 to PSTN gateway 806. The communication session may include media over IP 1038 between mobile station 702 and PSTN gateway 806 and PSTN data between PSTN gateway 806 and PSTN device 708.

Exemplary IP to 2G Mode Switching Call Flow

Figure 11:
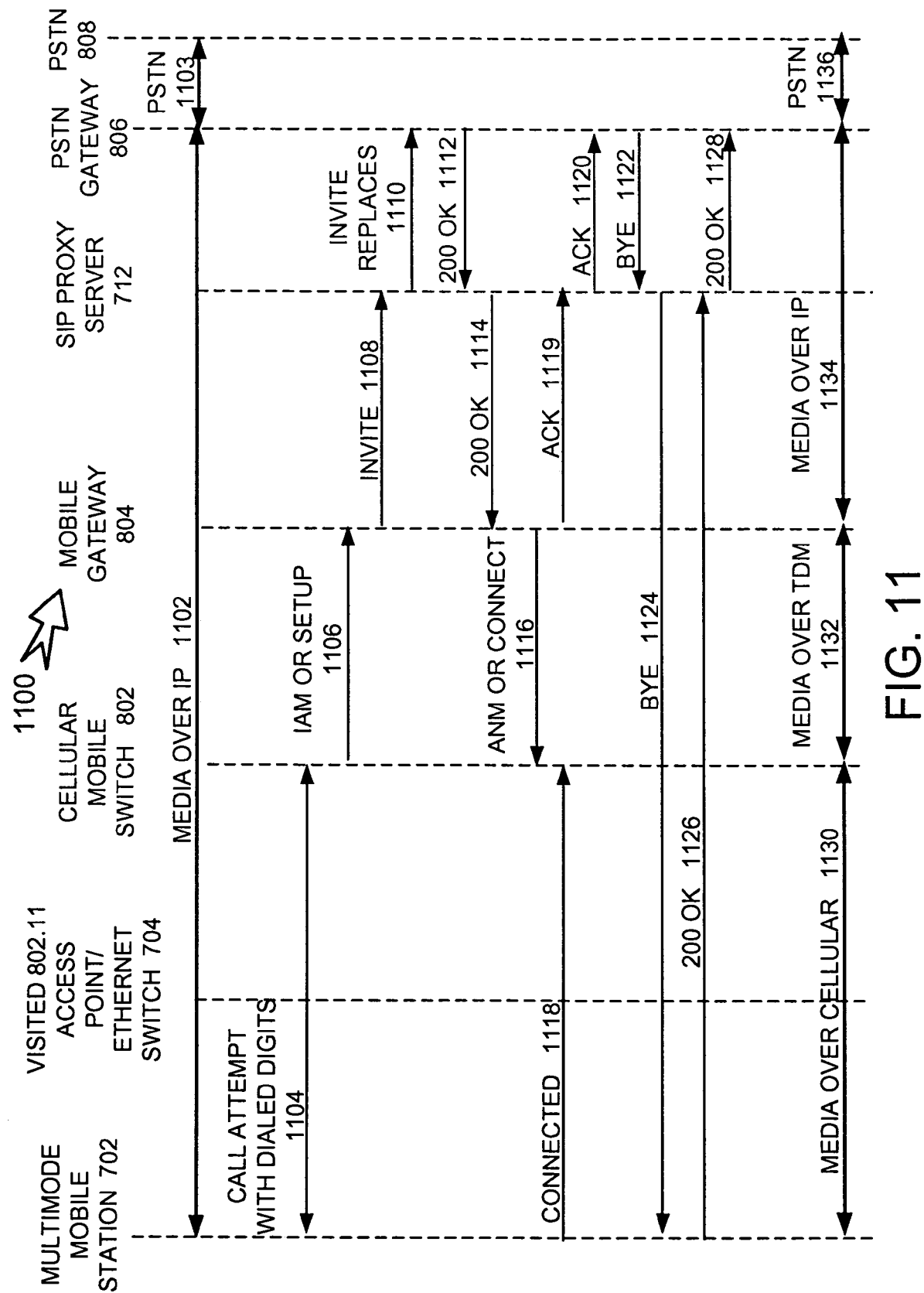
FIG. 11 illustrates an exemplary call flow that may be used to convey a call from a mobile station to a PSTN device using IP to 2G switching during a PSTN call consistent with the principles of the invention.

FIG. 11 illustrates an exemplary call flow that may be used to convey a call from a mobile station to a PSTN device using IP to 2G switching during a PSTN call consistent with the principles of the invention. Call flow 1100 may use a mobile station 702, an access point 704, a cellular mobile switch 802, a mobile gateway 804, a SIP proxy server 712, a PSTN gateway 806 and a PSTN device 808. Mobile station 702, access point 704, cellular mobile switch 802, mobile gateway 804, SIP proxy server 712, PSTN gateway 806 and PSTN device 808 may be configured and may operate as previously described.

Call flow 1100 may initially include media over IP 1102 between mobile station 702 and PSTN gateway 806 and a PSTN call 1103 between PSTN gateway 806 and PSTN device 808. During a communication session, call flow 1100 may transition to media over cellular 1130 between mobile station 702 and mobile switch 802, media over TDM 1132 between mobile switch 802 and mobile gateway 804, media over IP 1134 between mobile gateway 804 and PSTN gateway 806, and a PSTN call 1136 between PSTN gateway 806 and PSTN device 808. The transition may be initiated as a result of actions performed by a subscriber device, such as mobile station 702 and/or PSTN device 708.

Call flow 1100 may include a call attempt having dialed digits 1104 between mobile station 702 and mobile switch 802. Mobile switch 802 may issue an IAM or setup message 1106 to mobile gateway 804. IAM message 1106 may include the dialed digits. Mobile gateway 804 may send an INVITE request 1108 to SIP proxy server 712. SIP proxy server 712 may send an INVITE request including a 'Replaces' header 1110 to PSTN gateway 806, where the 'Replaces' header may operate to substitute a network identifier associated with one device with that of another. For example, INVITE request 1108 may include a network identifier associated with the sending device, here mobile gateway 804. When SIP proxy server 712 sends INVITE request 1110, the 'Replaces' header may include a network identifier associated with SIP proxy server 712 and/or another device on the network. INVITE requests using a 'Replaces' header may facilitate operations, such as call pickup, call forwarding, and call handoffs. PSTN gateway 806 may respond with a 200 OK response 1112. SIP proxy server 712 may receive 200 OK response 1112 and may issue a 200 OK response 1114 to mobile gateway 804.

Mobile gateway 804 may send an ANM or connect message 1116 to mobile switch 802. Mobile switch 802 may issue a connect message 1118 to establish a call with mobile station 702. Mobile gateway 804 may issue an ACK reply 1119 to SIP proxy server 712 to acknowledge receipt of 200 OK response 1114. SIP proxy server 712 may send an ACK reply 1120 to PSTN gateway 806 to acknowledge receipt of 200 OK response 1112.

PSTN gateway 806 may issue a BYE request 1122 that may be sent to SIP proxy server 712. SIP proxy server 712 may send a BYE request 1124 to mobile station 702 to disconnect a portion of the current communication session. SIP proxy server 712 may receive a 200 OK response 1126 from mobile station 702 acknowledging receipt of BYE request 1124. SIP proxy server 712 may send 200 OK response 1128 to PSTN gateway 806 to acknowledge receipt of BYE request 1122.

Exemplary User to User Call Flow

Figure 12:
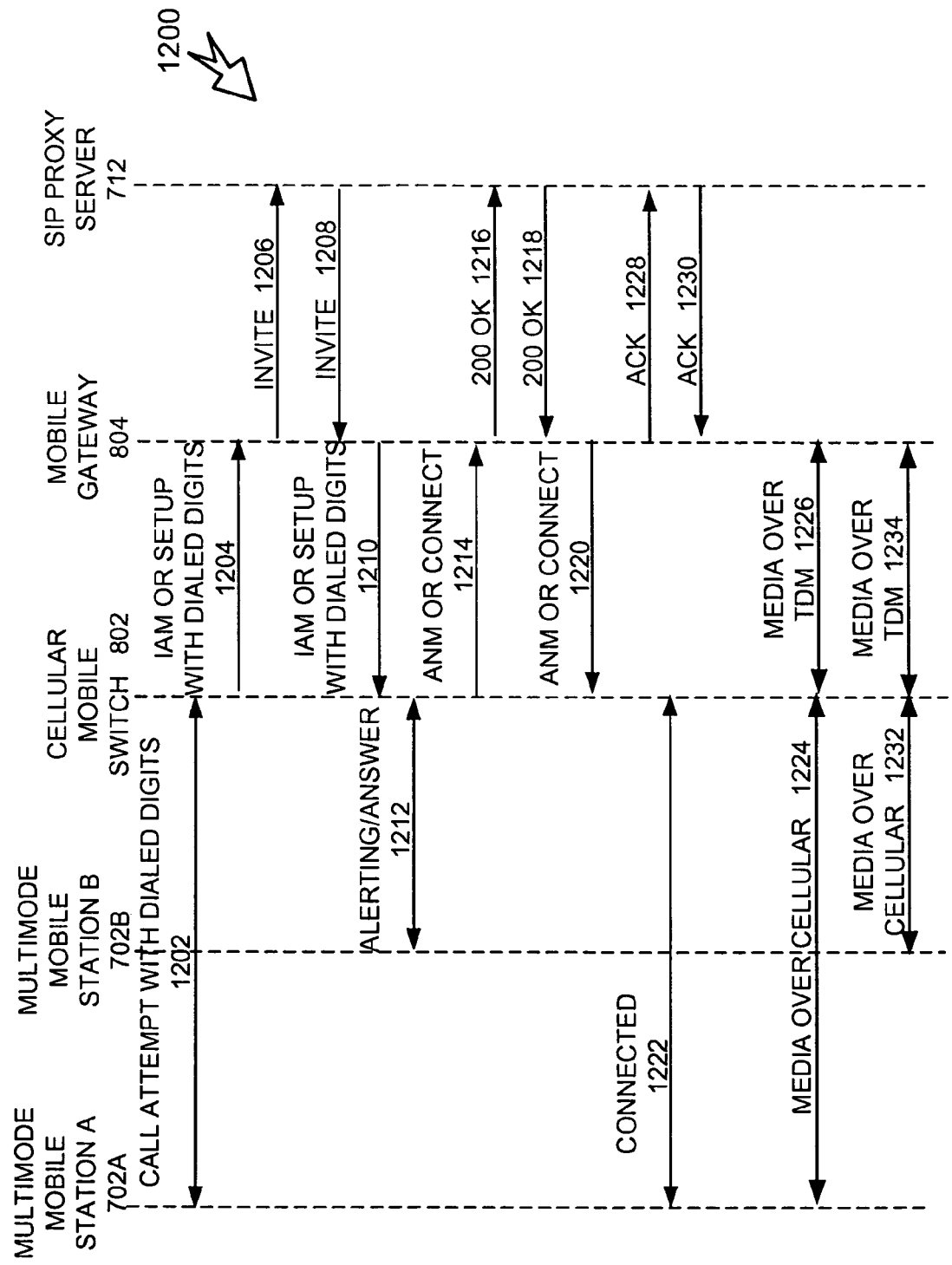
FIG. 12 illustrates an exemplary call flow that may be used to place a user-to-user call in a 2G mode consistent with the principles of the invention.

FIG. 12 illustrates an exemplary call flow that may be used to place a user-to-user call in a 2G mode consistent with the principles of the invention. Call flow 1200 may include a first dual mode mobile station 702A, a second dual mode mobile station 702B, a cellular mobile switch 802, a mobile gateway 804 and a SIP proxy server 712. First mobile station 702A and second mobile station 702B may be configured to operate in a manner substantially similar to mobile station 702. Mobile switch 802, mobile gateway 804 and SIP proxy server 712 may be configured to operate as previously described.

Call flow 1200 may commence when a call attempt including dialed digits 1202 is initiated between first mobile station 702A and mobile switch 802. Mobile switch 802 may send an IAM or setup message 1204 including dialed digits to mobile gateway 804. Mobile gateway 804 may send an INVITE request 1206 to SIP proxy server 712. INVITE request 1206 may operate to INVITE second mobile station 702B to join a communication session. SIP proxy server 712 may send an INVITE request 1208 to mobile gateway 804 in response to INVITE request 1206.

Mobile gateway 804 may send an IAM or setup message 1210 including dialed digits to mobile switch 802. Mobile switch 802 may issue an alerting message 1212 to second mobile station 702B. Second mobile station 702B may answer the alerting signal by answering the phone. Mobile switch 802 may send an ANM or connect message 1214 to mobile gateway 804 after issuing alerting message 1212 and/or detecting that second mobile station 702B has picked up the call. Mobile gateway 804 may send a 200 OK response 1216 to SIP proxy server 712 in response to receiving INVITE request 1208. SIP proxy server 712 may return a 200 OK response 1218 to acknowledge the receipt of INVITE request 1206.

Mobile gateway 804 may send an ANM or connect message 1220 to mobile switch 802. Mobile switch 802 may commence a calling session using connect message 1222. Mobile switch 802 may send connect message 1222 to first mobile station 702A. The calling session may take place between first mobile station 702A and second mobile station 702B. Mobile gateway 804 may send ACK response 1228 to SIP proxy server 712 to acknowledge receipt of 200 OK response 1218. SIP proxy server 712 may send an ACK response 1230 to mobile gateway 804 to acknowledge receipt and comprehension of 200 OK response 1216.

Call flow 1200 may include media over cellular data 1224 between first mobile station 702A and mobile switch 802 and may include media over TDM data 1226 between mobile switch 802 and mobile gateway 804. In addition, call flow 1200 may include media over cellular data 1232 between second mobile station 702B and mobile switch 802 and media over TDM 1234 between mobile switch 802 and mobile gateway 804.

Exemplary 2G to IP Mode Switching Call Flow

Figure 13:
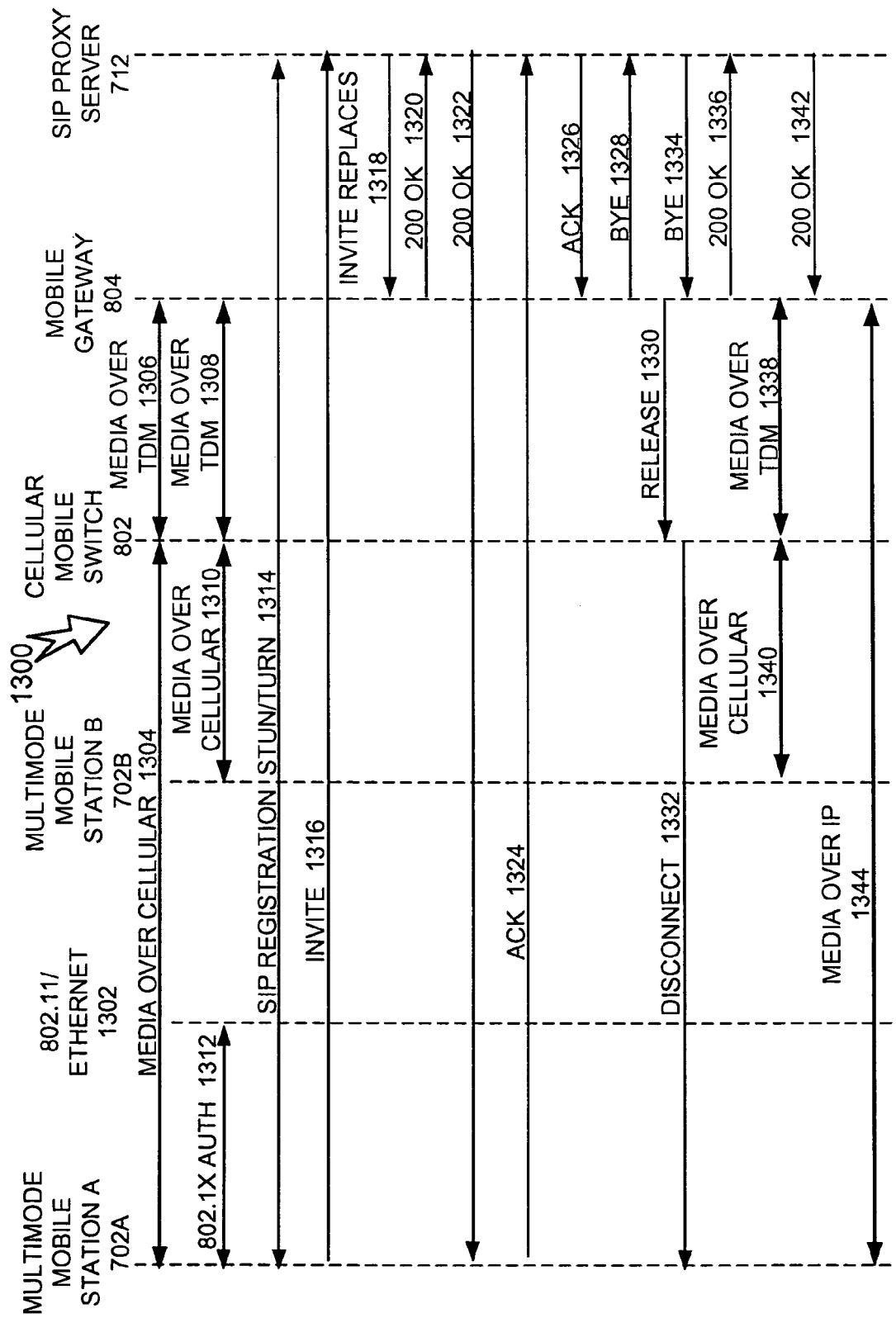
FIG. 13 illustrates an exemplary call flow that may be used to perform 2G to IP mode switching during a calling session consistent with the principles of the invention.

FIG. 13 illustrates an exemplary call flow that may be used to perform 2G to IP mode switching during a calling session consistent with the principles of the invention. Call flow 1300 may include a first dual mode mobile station 702A, an 802.11/Ethernet switch 1302 (hereinafter Ethernet switch 1302), a second dual mode mobile station 702B, a mobile switch 802, a mobile gateway 804 and a SIP proxy server 712. First mobile station 702A, second mobile station 702B, mobile switch 802, mobile gateway 804 and SIP proxy server 712 may be configured and may operate as previously described. 802.11/Ethernet switch 1302 may include any device capable of interfacing 802.11-compatible data to an Ethernet-compatible interface.

Call flow 1300 may initially include media over cellular data 1304 between first mobile station 702A and mobile switch 802, media over TDM data 1306 between mobile switch 802 and mobile gateway 804, media over cellular data 1310 between second mobile station 702B and mobile switch 802 and media over TDM 1308 between mobile switch 802 and mobile gateway 804. During a calling session, call flow 1300 may transition to include media over cellular 1340 between second mobile station 702B and mobile switch 802, media over TDM 1338 between mobile switch 802 and mobile gateway 804 and media over IP 1334 between first mobile station 702A and mobile gateway 804. The transition from one call media to another call media may occur as a result of a request made by a subscriber device, such as mobile station 702A or 702B.

First mobile station 702A may perform an 802.1x authorization 1312 with Ethernet switch 1302. A SIP registration 1314 may take place between first mobile station 702A and SIP proxy server 712. SIP registration 1314 may employ STUN and/or TURN for traversing network devices, such as firewalls. First mobile station 702A may issue an INVITE request 1316 SIP proxy server 712. INVITE request 1316 may be an invitation to have second mobile device 702B join a communication session. SIP proxy server 712 may send INVITE request 1318. INVITE request 1318 may include a 'Replaces' header. SIP proxy server 712 may send message 1318 to mobile gateway 804. Mobile gateway 804 may respond with a 200 OK response 1320 acknowledging receipt of INVITE request 1318. SIP proxy server 712 may send a 200 OK response 1322 to first mobile station 702A acknowledging receipt of INVITE request 1316. First mobile station 702A may return an acknowledgement (ACK) message 1324 acknowledging receipt of 200 OK response 1322. SIP proxy server 712 may send an acknowledgement (ACK) message 1326 to mobile gateway 804 in response to 200 OK response 1320.

A BYE request 1328 may be sent from mobile gateway 804 to SIP proxy server 712. BYE request 1328 may operate as an indication that mobile gateway 804 is going to disconnect a portion of a calling session. Mobile gateway 804 may send a release message 1330 to mobile switch 802. Disconnect message 1332 may be associated with a leg of a call. Release message 1330 may cause disconnect message 1332 to be sent to first mobile station 702A from mobile switch 802. When SIP proxy server 712 receives BYE request 1328 it may respond with BYE request 1334. Mobile gateway 804 may respond with a 200 OK response 1336 in response to BYE request 1334, and SIP proxy server 712 may send a 200 OK response 1342 back to mobile gateway 804 in response to BYE request 1328. Disconnect message 1332 may cause first mobile station 702A to communicate using media over IP 1344 between itself and mobile gateway 804.

CONCLUSION

Systems and methods consistent with the invention make possible seamless multimode communications using only a single SIP home server. As a result, a user can have a single identifier, such as a phone number or URI, that can be used for communicating over wireless networks, PSTNs, IP networks, and other networks. In addition, a user does not have to maintain separate service subscriptions with respective carriers in order to use multimode communication techniques.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of signaling flows have been described with respect to FIGS. 7 through 13 and while a series of acts have been described with respect to FIG. 6, the order of the signal flows and/or acts may be varied in other implementations consistent with the invention. Moreover, non-dependent signaling flows and/or acts may be implemented in parallel.

For example, implementations consistent with the principles of the invention can be implemented using network protocols, messaging sequences, network topologies, and communication devices other than those illustrated in the figures and described in the specification without departing from the spirit of the invention. In addition, the sequence of events associated with communication sessions described in conjunction with FIGS. 7-13 can be performed in orders other than those illustrated. Furthermore, additional events can be added, or removed, depending on the specific network topologies used and the needs of users and/or service providers. Moreover, non-dependent acts may be performed in parallel. Further, disclosed implementations may not be limited to any specific combination of hardware circuitry and/or software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise. The scope of the invention is defined by the following claims and their equivalents.

What is claimed is:

1. A method for conducting a communications session involving a communication terminal device accessing a network, the communication terminal device being associated with one or more user-specified thresholds, the method comprising:

at the communication terminal device, conducting communications corresponding to the communications session via a first mode of access;

determining, at the communication terminal device, that a second mode of access is available to be used for the communications corresponding to the communications session;

comparing one or more attributes associated with the first mode of access to one or more attributes associated with the second mode of access to obtain one or more differences;

comparing the one or more differences to the one or more user-specified thresholds;

from the communication terminal device, sending an indication to the network that the second mode of access is to be used based on a result of the comparing the one or more differences to the one or more user-specified thresholds; and at the communication terminal device, conducting subsequent communications corresponding to the communications session using the second mode of access.

2. The method of claim 1 further comprising,
contemporaneously with conducting communications using the second mode of access, discontinuing communications using the first mode of access.

3. The method of claim 1 where the sending the indication to the network causes the network to take action to conduct the subsequent communications corresponding to the communications session using the second mode of access.

4. The method of claim 1 where the communications session is substantially maintained in an active state as the communications session is transitioned from using the first mode of access to the second mode of access.

5. The method of claim 1 where the conducting the subsequent communications corresponding to the communications session using the second mode of access is conditionally performed responsive to detecting at the communication terminal device whether communications via the second mode of access have been successfully established.

6. The method of claim 1 where the communication terminal device is capable of functioning as a wireless mobile communication device.

7. The method of claim 6 where the wireless mobile communication device is a dual-mode device configured to perform mobile telephony communications and to perform wireless local area network communications.

8. The method of claim 1 where the communication terminal device is configured to be communicably coupled to a wired local area network and to employ the local area network as a mode of access.

9. The method of claim 1 where the first and second modes of access comprise wireless communications and the first mode of access employs transmissions in a different radio frequency band than that of the second mode of access.

10. The method of claim 1 where the first and second modes of access comprise wireless communications and the first mode of access employs transmissions complying with a different transmission protocol than that of the second mode of access.

11. The method of claim 1 further comprising:
during the communications session, providing an indication to a user, via the communication terminal device, that the second mode of access will be used for subsequent communications.

12. The method of claim 1 further comprising:
providing to a user, via the communication terminal device, an indication that communications using the second mode of access have been successfully established.

13. The method of claim 1 further comprising:
during the communications session, providing an indication to a user, via the communication terminal device, that the second mode of access is available.

14. The method of claim 13 where the indication to the user is provided via at least one of an audible signal, a visual signal, or a mechanical motion exhibited by the communication terminal device.

15. The method of claim 1 further comprising:
receiving an indication from a user as to whether the second mode of access is accepted by the user of the communication terminal device and, in response, conducting subsequent communications corresponding to the communications session using the second mode of access.

16. The method of claim 15 further comprising:
conveying, to the user via the communication terminal device, information pertaining to at least one of the first mode of access or the second mode of access to enable the user to decide whether the second mode of access is acceptable.

17. The method of claim 1 where the one or more user-specified thresholds are persistently stored in the communication terminal device.

18. The method of claim 1 where the conducting subsequent communications corresponding to the communications session using the second mode of access is conditionally performed subject to a preset authorization set by the user to allow for mid-session access mode switching.

19. A communication terminal device for conducting a communications session by accessing a network, the communication terminal being associated with a user-specified threshold, the communication terminal device comprising:
means for conducting communications corresponding to the communications session via a first mode of access;
means for determining that a second mode of access is available to be used for the communications corresponding to the communications session;
means for comparing an attribute associated with the first mode of access to an attribute associated with the second mode of access to obtain a difference;
means for comparing the difference to the user-specified threshold;
means for sending an indication to the network that the second mode of access is to be used based on a result of comparing the difference to the user-specified threshold; and
means for conducting subsequent communications corresponding to the communications session using the second mode of access.

20. The communication terminal device of claim 19 where the means for sending the indication to the network comprises means for sending a session initiation protocol (SIP) INVITE message to the network during the session.

21. A method in a communications network for conducting a communications session involving a communications terminal device, the communications terminal device being associated with a user-specified threshold, the method comprising:
conducting communications corresponding to the communications session via a first mode of access between the network and the device;
comparing an attribute associated with the first mode of access to an attribute associated with the second mode of access to obtain a difference;
comparing the difference to the user-specified threshold;
receiving an indication from the device that a second mode of access between the network and the device is to be used for subsequent communications corresponding to the communications session based on a result of comparing the difference to the user-specified threshold; and conducting subsequent communications corresponding to the communications session using the second mode of access between the network and the device.

22. The method of claim 21 where a degree of mobility of the device enabled by the first mode of access is substantially different than the mobility enabled by the second mode of access.

23. The communication terminal device of claim 19, where the attribute associated with the first mode of access and the attribute associated with the second mode of access relate to at least one of:

a signal strength of a first network associated with the first mode of access and a second network associated with the second mode of access, a signal-to-noise ratio of the first network and the second network, a bit error rate of the first network and the second network, a bandwidth of the first network and the second network, a physical proximity of the communication terminal device to the first network and the second network, a quality provided by the first network and the second network, a reliability of the first network and the second network, a cost of using the first network and the second network, a level of security provided by the first network and the second network, or capability supported by the first network and the second network.

* * * * *